(12) United States Patent
Wu et al.

(10) Patent No.: US 10,175,456 B2
(45) Date of Patent: Jan. 8, 2019

(54) IMAGING LENS ASSEMBLY, IMAGE CAPTURING APPARATUS AND ELECTRONIC DEVICE

(71) Applicant: LARGAN PRECISION CO., LTD., Taichung (TW)

(72) Inventors: Chien-Hsun Wu, Taichung (TW); Hsiang Chi Tang, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 13 days.

(21) Appl. No.: 15/376,931

(22) Filed: Dec. 13, 2016

(65) Prior Publication Data

US 2018/0052304 A1    Feb. 22, 2018

(30) Foreign Application Priority Data

Aug. 22, 2016   (TW) .............................. 105126725 A

(51) Int. Cl.
| | |
|---|---|
| *G02B 13/18* | (2006.01) |
| *G02B 3/02* | (2006.01) |
| *G02B 13/00* | (2006.01) |
| *H04N 5/235* | (2006.01) |
| *G02B 9/62* | (2006.01) |

(52) U.S. Cl.
CPC ....... *G02B 13/0045* (2013.01); *H04N 5/2353* (2013.01); *G02B 9/62* (2013.01)

(58) Field of Classification Search
CPC .. G02B 13/0045; G02B 9/62; G02B 27/0025; G02B 5/005; H04N 5/2353
See application file for complete search history.

(56) References Cited

U.S. PATENT DOCUMENTS

2014/0327808 A1* 11/2014 Chen ..................... G02B 9/62
  348/335
2017/0307849 A1* 10/2017 Jhang ................ G02B 13/0045

FOREIGN PATENT DOCUMENTS

| CN | 104808318 A | 7/2015 |
| TW | I531815 B | 5/2016 |

* cited by examiner

*Primary Examiner* — Alicia M Harrington
(74) *Attorney, Agent, or Firm* — Locke Lord LLP; Tim Tingkang Xia, Esq.

(57) ABSTRACT

The present disclosure provides an imaging lens assembly including, in order from an object side to an image side: a first lens element with positive refractive power having an object-side surface being convex in a paraxial region thereof; a second lens element with negative refractive power having an object-side surface being concave in a paraxial region thereof; a third lens element; a fourth lens element; a fifth lens element having an object-side surface being concave in a paraxial region thereof, both of the object-side surface and an image-side surface thereof being aspheric; and a sixth lens element having an object-side surface and an image-side surface being both aspheric. The imaging lens assembly has a total of six lens elements.

32 Claims, 20 Drawing Sheets

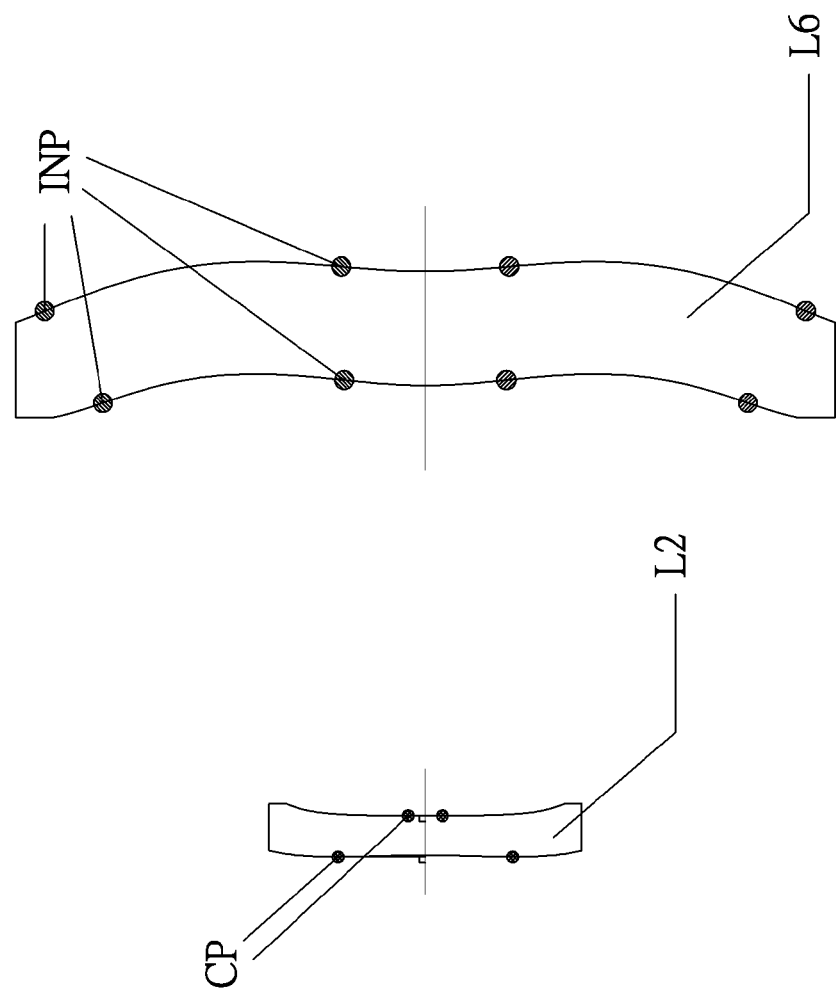

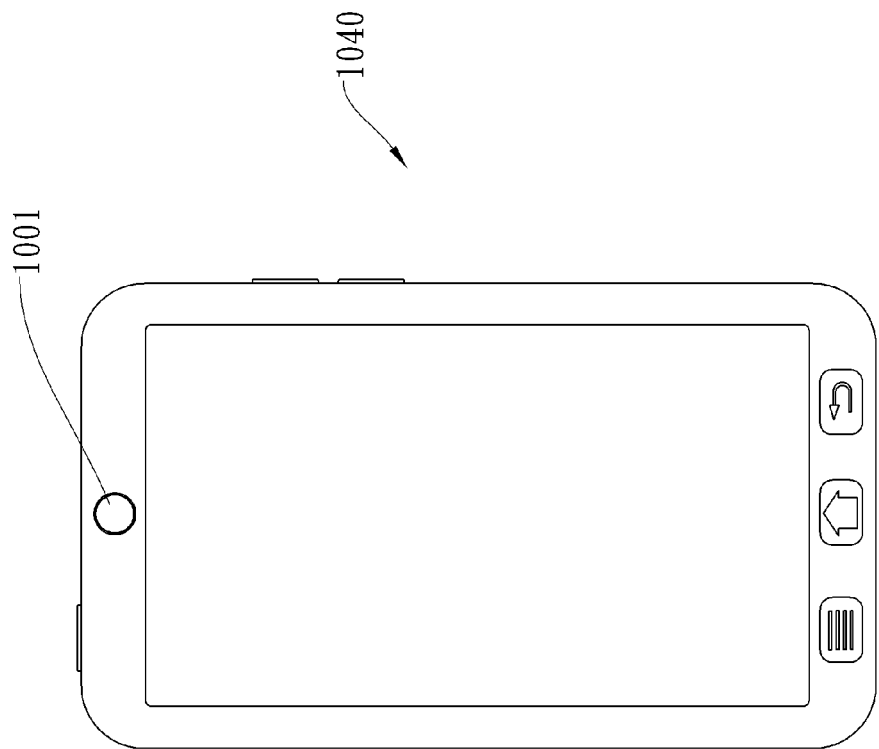

IMAGING LENS ASSEMBLY, IMAGE CAPTURING APPARATUS AND ELECTRONIC DEVICE

RELATED APPLICATIONS

This application claims priority to Taiwan Application Serial Number 105126725, filed on Aug. 22, 2016, which is incorporated by reference herein in its entirety.

BACKGROUND

Technical Field

The present disclosure relates to an imaging lens assembly and an image capturing apparatus, and more particularly, to an imaging lens assembly and an image capturing apparatus applicable to electronic devices.

Description of Related Art

As photographing modules are commonly used in a wide variety of applications, incorporating photographing modules in even more products, such as various smart electronic products, vehicle equipment, identification systems, entertainment devices, sports equipment and smart home systems, is a growing trend for technology-driven industries. To offer enhanced user experience, many manufacturers in the market are now producing mainstream smart devices equipped with one or even multiple photographing modules. To cope with such needs, various lens systems with different characteristics have been developed for the market.

In addition, due to modern consumer demands in smaller, thinner and lighter electronic products, conventional photographing lenses have become unsatisfactory for some consumers as those lenses cannot fulfill the needs for both compactness and the high-end image quality at the same time. Compact lenses offering large apertures or telephoto features are particularly rare. Therefore, it is clear that current telephoto lenses, which often come with excessively long total track lengths, larger body sizes and smaller apertures, cannot satisfy future market needs.

SUMMARY

According to one aspect of the present disclosure, an imaging lens assembly comprises, in order from an object side to an image side: a first lens element with positive refractive power having an object-side surface being convex in a paraxial region thereof; a second lens element with negative refractive power having an object-side surface being concave in a paraxial region thereof; a third lens element; a fourth lens element; a fifth lens element having an object-side surface being concave in a paraxial region thereof, both of the object-side surface and an image-side surface thereof being aspheric; and a sixth lens element having an object-side surface and an image-side surface which are both aspheric. The imaging lens assembly has a total of six lens elements, wherein each of the first through sixth lens elements is a single and non-cemented lens element; and wherein a sum of axial distances between every two adjacent lens elements of the imaging lens assembly is ΣAT, an axial distance between the third lens element and the fourth lens element is T34, a focal length of the first lens element is f1, a focal length of the second lens element is f2, a focal length of the imaging lens assembly is f, an axial distance between the image-side surface of the sixth lens element and an image surface is BL, and the following conditions are satisfied:

$1.2 < \Sigma AT/T34 < 2.0$;

$|f1/f2| < 0.90$;

and $4.0 < f/BL$.

According to another aspect of the present disclosure, an image capturing apparatus comprises the aforementioned imaging lens assembly and an image sensor.

According to yet another aspect of the present disclosure, an electronic device comprises the aforementioned image capturing apparatus.

According to another aspect of the present disclosure, an imaging lens assembly comprises, in order from an object side to an image side: a first lens element with positive refractive power having an object-side surface being convex in a paraxial region thereof; a second lens element with negative refractive power having an object-side surface being concave in a paraxial region thereof; a third lens element; a fourth lens element; a fifth lens element having an object-side surface being concave in a paraxial region thereof, both of the object-side surface and an image-side surface thereof being aspheric; and a sixth lens element having an object-side surface and an image-side surface which are both aspheric. The imaging lens assembly has a total of six lens elements, wherein each of the first through sixth lens elements is a single and non-cemented lens element; and wherein a sum of axial distances between every two adjacent lens elements of the imaging lens assembly is ΣAT, an axial distance between the third lens element and the fourth lens element is T34, a focal length of the first lens element is f1, a focal length of the x-th lens element is fx, a focal length of the imaging lens assembly is f, an axial distance between the image-side surface of the sixth lens element and an image surface is BL, and the following conditions are satisfied:

$1.2 < \Sigma AT/T34 < 2.5$;

$|f1| < |fx|$, wherein x=2~6; and $4.0 < f/BL$.

According to yet another aspect of the present disclosure, an electronic device comprises an image capturing apparatus, wherein the image capturing apparatus comprises the imaging lens assembly described above and an image sensor.

According to another aspect of the present disclosure, an imaging lens assembly comprises, in order from an object side to an image side: a first lens element with positive refractive power having an object-side surface being convex in a paraxial region thereof a second lens element having negative refractive power; a third lens element; a fourth lens element; a fifth lens element; and a sixth lens element having an object-side surface and an image-side surface which are both aspheric, and having an inflection point in an off-axial region thereof. The imaging lens assembly has a total of six lens elements, wherein each of the first through sixth lens elements is a single and non-cemented lens element; and wherein a sum of axial distances between every two adjacent lens elements of the imaging lens assembly is ΣAT, an axial distance between the third lens element and the fourth lens element is T34, a focal length of the first lens element is f1, a focal length of the x-th lens element is fx, a focal length of the imaging lens assembly is f, an axial distance between the image-side surface of the sixth lens element and an image surface is BL, an axial distance between the second lens element and the third lens element is T23, a central thickness of the second lens element is CT2, a central thickness of the third lens element is CT3, and the following conditions are satisfied:

$1.2 < \Sigma AT/T34 < 2.0;$ $|f1| < |fx|,$ wherein x=2~6;

$4.0 \leq f/BL;$ and $0 < T23/(CT2+CT3) < 0.80.$

According to yet another aspect of the present disclosure, an electronic device comprises an image capturing apparatus, wherein the image capturing apparatus comprises the imaging lens assembly described above and an image sensor.

BRIEF DESCRIPTION OF THE DRAWINGS

FIG. 8 is a schematic view showing inflection points on the sixth lens element and critical points on the second lens element;

FIG. 10D shows a smartphone with an image capturing apparatus of the present disclosure installed therein.

DETAILED DESCRIPTION

Figure 1A:
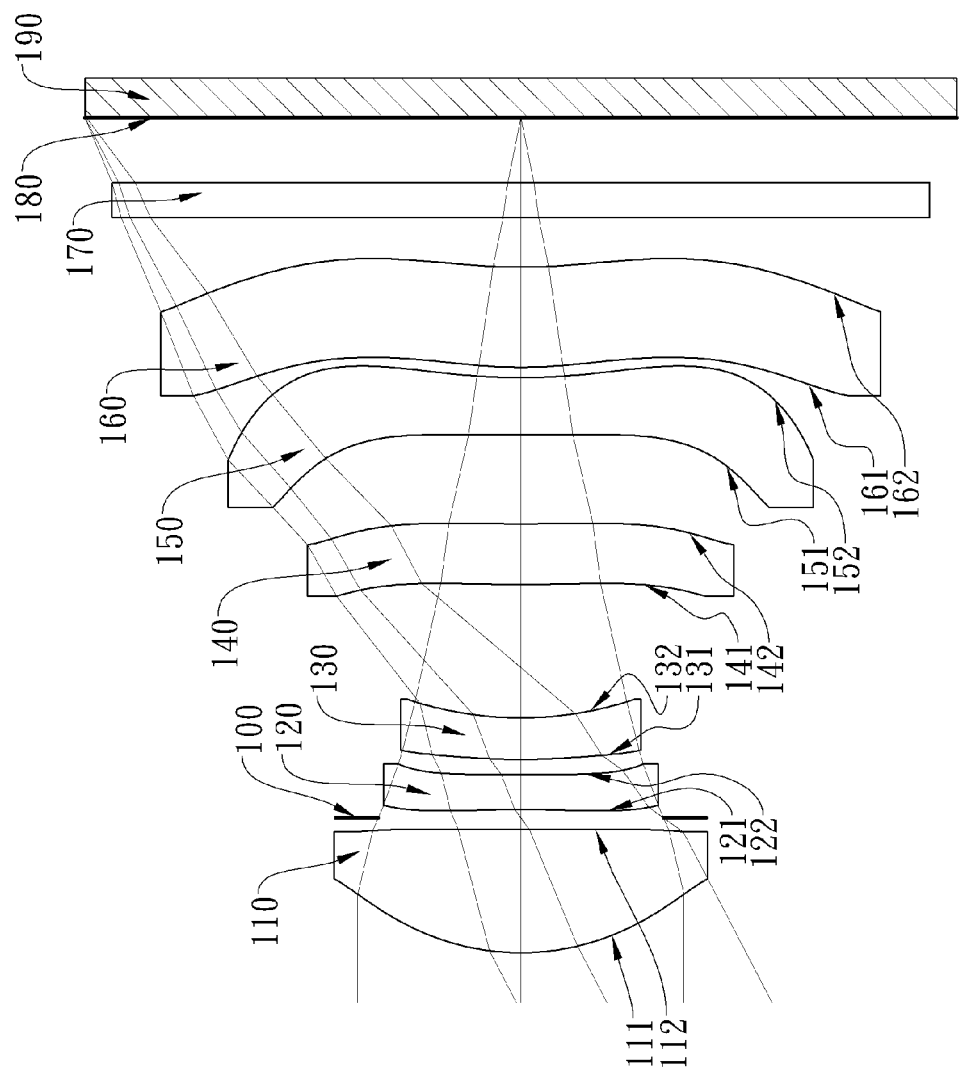
FIG. 1A is a schematic view of an image capturing apparatus according to the 1st embodiment of the present disclosure.

The present disclosure provides an imaging lens assembly comprising, from an object side to an image side, a first lens element, a second lens element, a third lens element, a fourth lens element, a fifth lens element and a sixth lens element.

With the first lens element having relatively higher positive refractive power, the imaging lens assembly according to the present disclosure can allow light rays to enter the lens system more favorably when a larger aperture is arranged. Also, the first lens element can correct aberrations and improve convergence of light rays while other lens elements having relatively lower refractive power. The imaging lens assembly can thus satisfy the needs for high image quality while maintaining a compact size. The aforementioned lens configurations are advantageous for optionally including a shutter device or an aperture adjusting device, and the configurations can be applied to compact electronic devices including (but not limited to) portable devices and multi-lens image capturing apparatuses in general.

Each of the first, second, third, fourth, fifth and sixth lens elements in the imaging lens assembly is a single and non-cemented (or non-bonded) lens element; that is, every two adjacent lens elements can have an air gap between them on the optical axis. A manufacturing process involving cemented lens elements is more complicated than one involving non-cemented lens elements. In particular, when cementing two lens elements, the curvature precision of the two cementing surfaces is required to be highly precise, so that the two lens elements can be closely fitted to each other after the cementing process is completed. Moreover, displacements may occur during the cementing process, which may cause the lens elements to be poorly fitted and may further affect the overall image quality. As such, with each lens element being a single and non-cemented lens element, the imaging lens assembly can effectively avoid problems generated from cemented lens elements.

The first lens element has positive refractive power. This feature can concentrate the convergence capability of the imaging lens assembly at the object side, and consequently, the size of the imaging lens assembly can be effectively controlled and portability can be improved as well. The first lens element has an object-side surface being convex in a paraxial region thereof and is favorable for proper distribution of positive refractive power, while further improving the miniaturization of the imaging lens assembly accordingly.

The second lens element has negative refractive power for correcting chromatic aberrations of the lens system. The second lens element may have a concave object-side surface and is favorable for providing a wider angle of view. The second lens element can further correct aberrations generated by the first lens element with positive refractive power. FIG. 8 includes a schematic view showing critical points CP on the second lens element L2. A critical point CP is a tangent point on a surface of a lens element with a tangent line perpendicular to the optical axis, excluding the intersection points between the surface of the lens element and the optical axis. When the second lens element has at least one critical point in an off-axial region thereof, it can facilitate the correction of off-axis aberrations for a large field of view and can improve relative illumination in the off-axial region.

The fifth lens element may have a concave object-side surface so that the lens system can acquire better aberration correction capability.

The sixth lens element may have positive refractive power so that the back focal length of the lens system can be reduced to further achieve a more compact system. The sixth lens element may have an image-side surface being concave in a paraxial region thereof, and the image-side surface may have at least one convex shape in an off-axial region thereof, so that principal points can move toward the object side, which can help retrieving light and further reduce the back focal length. The sixth lens element may have at least one inflection point to help correct aberrations at the image periphery. Referring to FIG. 8, an inflection point INP is a point on a surface of the lens element where the surface curvature changes from being convex to concave, or vice versa. When the sixth lens element has at least one inflection point in an off-axial region, aberrations at the image periphery can be favorably corrected and the image quality can be improved. In addition, it is favorable for preventing the peripheral shape of the sixth lens element from being excessively curved, while avoiding possible manufacturing problems or surface reflections that will affect the image quality.

When a sum of axial distances between every two adjacent lens elements of the imaging lens assembly is $\Sigma AT$, an axial distance between the third lens element and the fourth lens element is T34, and the following condition is satisfied: $1.2<\Sigma AT/T34<2.5$, it can ensure a balanced configuration of the lens elements with smaller effective radii being closer to an imaged object and the lens elements with larger effective radii being closer to an image surface, which is favorable for the collocation of lens elements. Preferably, the following condition is satisfied: $1.2<\Sigma AT/T34<2.0$.

When a focal length of the first lens element is f1, a focal length of the second lens element is f2, and the following condition is satisfied: $|f1/f2|<0.90$, aberrations closer to the object side of the imaging lens assembly can be corrected.

When a focal length of the imaging lens assembly is f, an axial distance between the image-side surface of the sixth lens element and an image surface is BL, and the following condition is satisfied: $4.0<f/BL$, telephoto capability of the imaging lens assembly can be enhanced, and the proportion of the back focal length of the imaging lens assembly to the sum of axial distances between every two adjacent lens elements can be properly allocated, which is favorable for the miniaturization of the imaging lens assembly. Preferably, the following condition is satisfied: $4.0<f/BL<10.0$.

When the focal length of the first lens element is f1, a focal length of the x-th lens element is fx, and the following condition is satisfied: $|f1|<|fx|$, wherein x=2~6, it can ensure that the first lens element has the largest refractive power in the imaging lens assembly, and the first lens element can correct aberrations and improve convergence of light rays while other lens elements having relatively lower refractive power.

When an axial distance between the second lens element and the third lens element is T23, a central thickness of the second lens element is CT2, a central thickness of the third lens element is CT3, and the following condition is satisfied: $0<T23/(CT2+CT3)<0.80$, it can prevent the axial distance between the second lens element and the third lens element, which are thinner lens elements in the imaging lens assembly, from becoming excessively large, so that difficulties in the manufacturing and assembling process can be avoided.

When a curvature radius of an object-side surface of the second lens element is R3, a curvature radius of an image-side surface of the second lens element is R4, and the following condition is satisfied: $-3.0<(R3+R4)/(R3-R4)<0$, it can ensure that the shape variation of the second lens element is more moderate and prevent the shape of the second lens element, which is relatively thinner in the imaging lens assembly, from becoming overly curved. Consequently, it is favorable for improving the molding yield rate for the second lens element and the image quality.

When the axial distance between the third lens element and the fourth lens element is T34, the axial distance between the image-side surface of the sixth lens element and an image surface is BL, and the following condition is satisfied: $0.80<T34/BL<2.50$, it can further reduce the back focal length for the miniaturization of the imaging lens assembly.

When the focal length of the imaging lens assembly is f, a focal length of the fifth lens element is f5, and the following condition is satisfied: $-1.50<f/f5<-0.40$, it can further correct aberrations generated by the first lens element, which has higher positive refractive power. When the above condition is satisfied, it is also favorable for moving the principal points toward the object as well as reducing the back focal length and the chief ray angle (CRA) at the image periphery, thereby ensuring enough illuminance at the paraxial region of the image surface.

When an axial distance between the object-side surface of the first lens element and the image-side surface of the sixth lens element is Td, the sum of axial distances between every two adjacent lens elements of the imaging lens assembly is $\Sigma AT$, and the following condition is satisfied: $1.50<Td/\Sigma AT<3.50$, it is favorable for arranging the axial distances between adjacent lens elements more properly, and avoiding poor utilization of the space due to excessively large spacing, or congested space due to excessively small spacing between lens elements.

When the focal length of the second lens element is f2, a focal length of the y-th lens element is fy, and the following condition is satisfied: $|f2|<|fy|$, wherein y=3~6, it can ensure that the second lens element has higher refractive power, and hence the second lens element can correct aberrations and improve convergence of light rays while other lens elements having relatively lower refractive power.

When an Abbe number of the sixth lens element is V6, and the following condition is satisfied: $5<V6<32$, it is favorable for acquiring a better balance between the correction of chromatic aberration and astigmatism.

Figure 9:
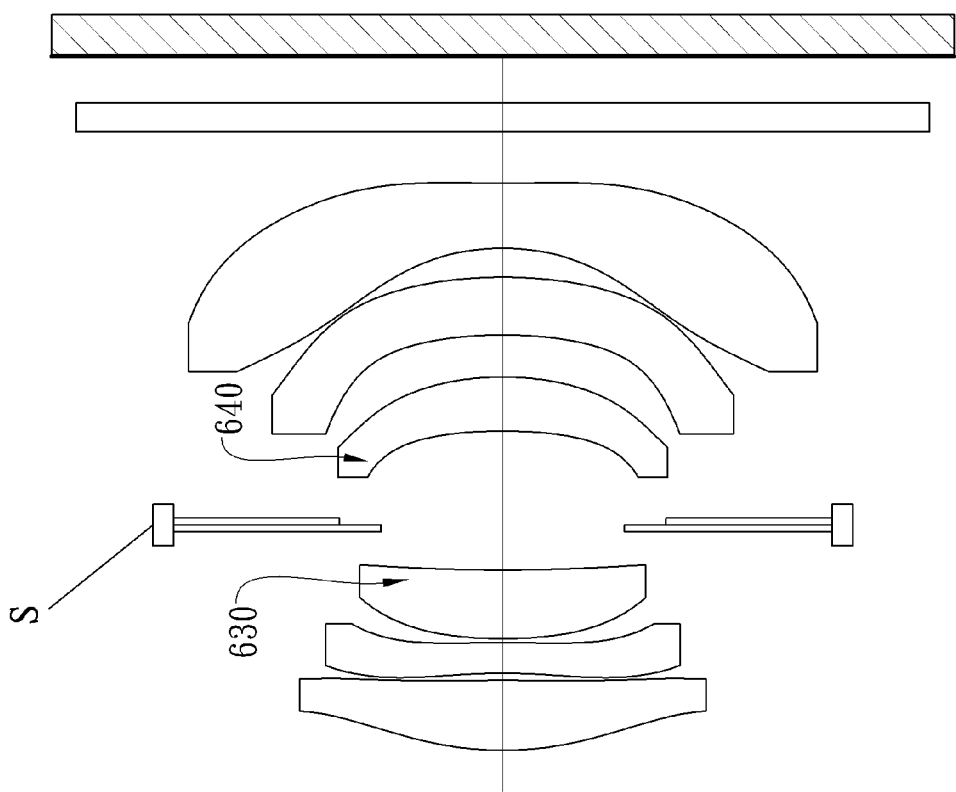
FIG. 9 is a schematic view showing a shutter device or an aperture adjusting device located between the third lens element and the fourth lens element.
Figure 10A:
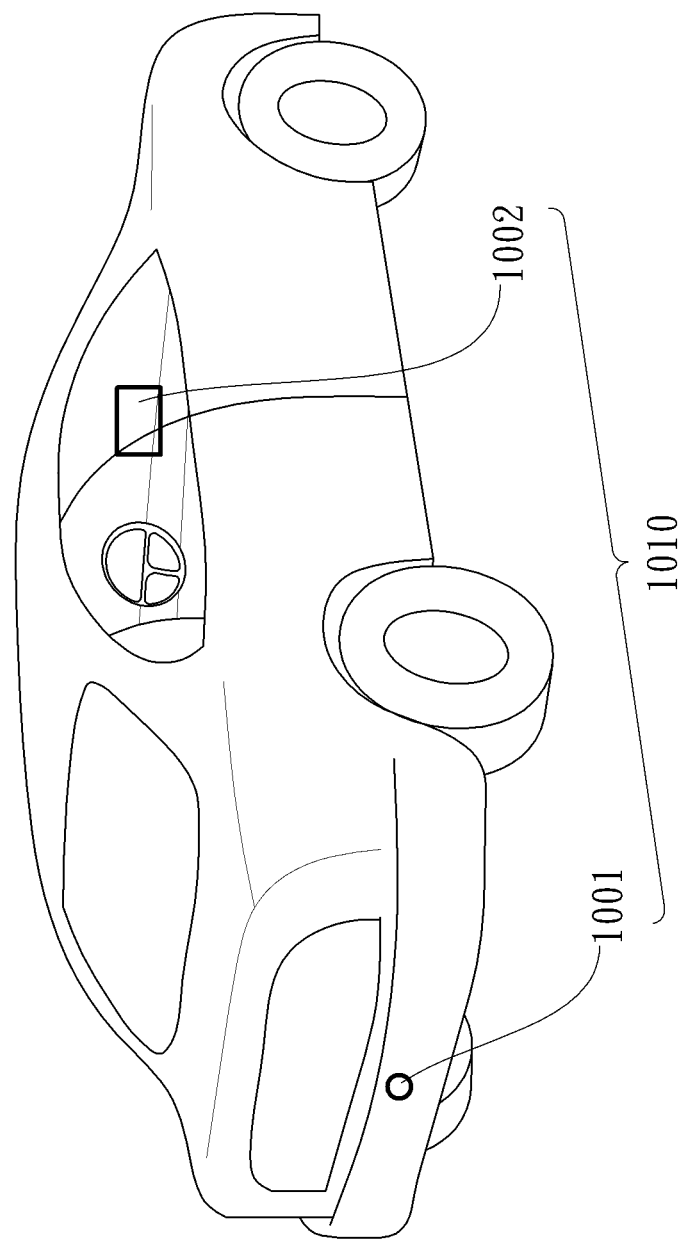
FIG. 10A shows a rear view camera with an image capturing apparatus of the present disclosure installed therein.
Figure 10B:
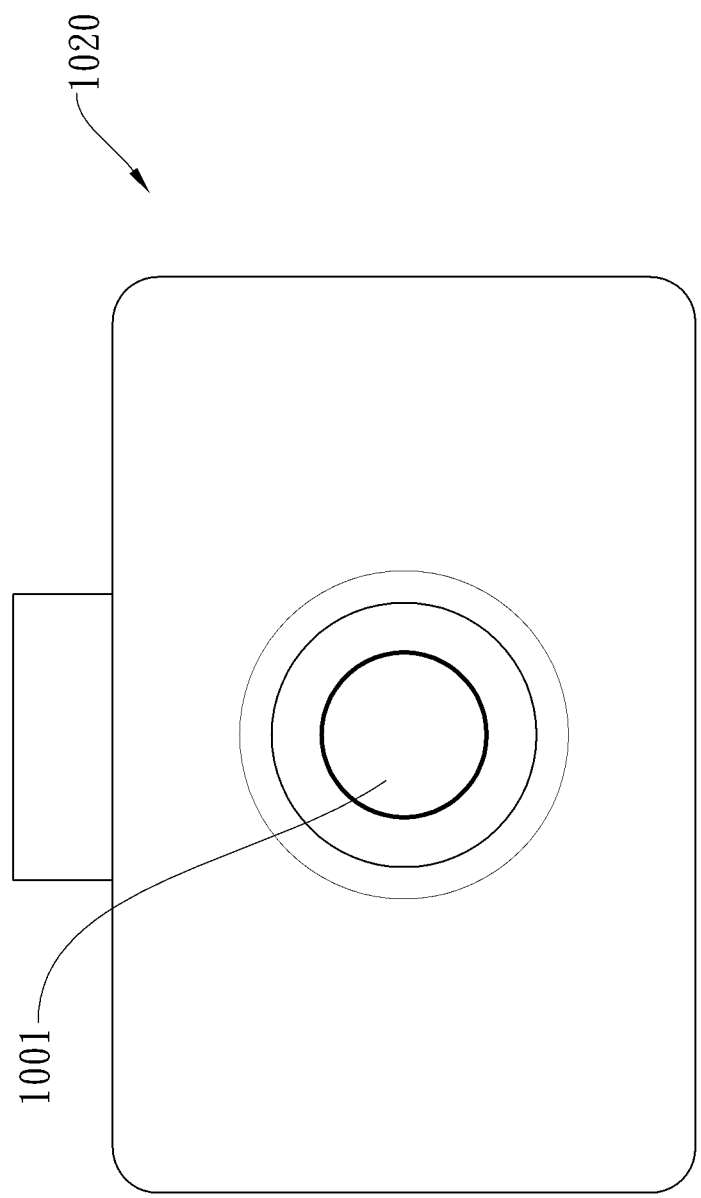
FIG. 10B shows a driving recording system with an image capturing apparatus of the present disclosure installed therein.
Figure 10C:
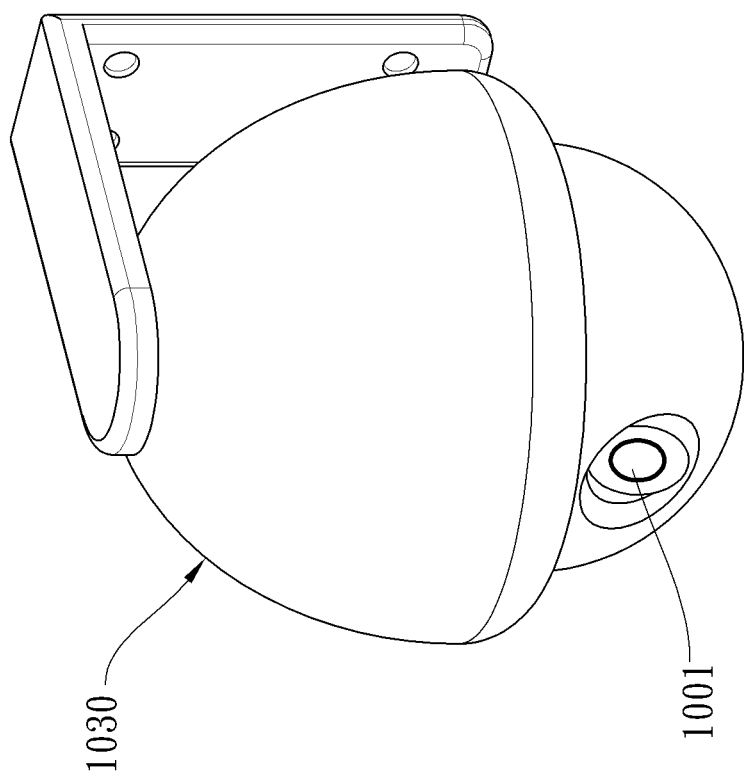
FIG. 10C shows a surveillance camera with an image capturing apparatus of the present disclosure installed therein.

FIG. 9 is a schematic view showing a shutter device or aperture adjusting device S located between the third lens element and the fourth lens element. When the shutter device or aperture adjusting device S is provided between the third lens element and the fourth lens element, the imaging lens assembly can be configured with a large aperture to allow sufficient light to enter the imaging lens assembly. Alternatively, the imaging lens assembly can also provide a telephoto mode with a small aperture. Thus, the imaging lens assembly can be used in a wide variety of applications and can be advantageously installed in various smart devices.

When the focal length of the fifth lens element is f5, a focal length of the sixth lens element is f6, and the following condition is satisfied: |f5/f6|<1.0, it is favorable for preventing the refractive power of the sixth lens element from becoming excessively large with aberration overcorrections and poor image quality.

When a central thickness of the fifth lens element is CT5, a central thickness of the sixth lens element is CT6, and the following condition is satisfied: 0.10<CT5/CT6<1.0, it is favorable for preventing the sixth lens element from becoming overly thin, which may cause the lens element to crack during the assembling process due to a weak structure.

According to the imaging lens assembly of the present disclosure, the lens elements thereof can be made of glass or plastic. When the lens elements are made of glass, the distribution of the refractive power of the imaging lens assembly is more flexible to design. When the lens elements are made of plastic, the manufacturing cost can be effectively reduced. Furthermore, surfaces of each lens element can be arranged to be aspheric (ASP). As aspheric surfaces can be easily formed into shapes other than spherical shapes, more controllable variables can be obtained to eliminate aberrations and to further decrease the required number of lens elements, and consequently, the total track length of the imaging lens assembly can be effectively reduced.

According to the imaging lens assembly of the present disclosure, the imaging lens assembly can include at least one stop, such as an aperture stop, a glare stop or a field stop, so as to favorably reduce the amount of stray light and thereby to improve the image quality.

According to the imaging lens assembly of the present disclosure, a stop can be configured as a front stop or a middle stop. A front stop disposed between an imaged object and the first lens element can provide a longer distance between an exit pupil of the imaging lens assembly and the image surface, so that the generated telecentric effect can improve the image-sensing efficiency of an image sensor, such as a CCD or CMOS sensor. A middle stop disposed between the first lens element and the image surface is favorable for enlarging the field of view of the imaging lens assembly, thereby providing the imaging lens assembly with the advantages of a wide-angle lens.

According to the imaging lens assembly of the present disclosure, when the lens element has a convex surface and the region of convex shape is not defined, it indicates that the surface can be convex in the paraxial region thereof when the lens element has a concave surface and the region of concave shape is not defined, it indicates that the surface can be concave in the paraxial region thereof. Likewise, when the region of refractive power or focal length of a lens element is not defined, it indicates that the region of refractive power or focal length of the lens element can be in the paraxial region thereof.

According to the imaging lens assembly of the present disclosure, the image surface of the imaging lens assembly, based on the corresponding image sensor, can be a plane or a curved surface with any curvature, especially a curved surface being concave facing towards the object side.

The imaging lens assembly of the present disclosure can be optionally applied to moving-focus optical systems. The imaging lens assembly of the present disclosure features good correction capability and high image quality, and can be applied to electronic devices including, but not limited to, motion-detection imaging devices, head-mounted displays, night vision cameras, car cameras, surveillance cameras, drone cameras, sports and action cameras, multi-lens image capturing devices, digital cameras, mobile devices, smart phones, digital tablets, smart TVs, network surveillance devices, motion sensing input devices, driving recording systems, rear view camera systems, and wearable devices.

The present disclosure further provides an image capturing apparatus comprising the aforementioned imaging lens assembly and an image sensor, wherein the image sensor is disposed on or near an image surface of the imaging lens assembly. Therefore, the design of the imaging lens assembly enables the image capturing apparatus to achieve the best image quality. Preferably, the imaging lens assembly can further comprise a barrel member, a holding member or a combination thereof.

Referring to FIG. 10A, FIG. 10B, FIG. 10C and FIG. 10D, an image capturing apparatus 1001 and a display system 1002 may be installed in an electronic device including, but not limited to, a rear view camera 1010, a driving recording system 1020, a surveillance camera 1030, or a smartphone 1040. The four exemplary figures of different electronic devices are only exemplary for showing the image capturing apparatus of the present disclosure installed in an electronic device, and the present disclosure is not limited thereto. Preferably, the electronic device can further comprise a control unit, a display unit, a storage unit, a random access memory unit (RAM) or a combination thereof.

According to the above description of the present disclosure, the following 1st-7th specific embodiments are provided for further explanation.

1st Embodiment

Figure 1B:
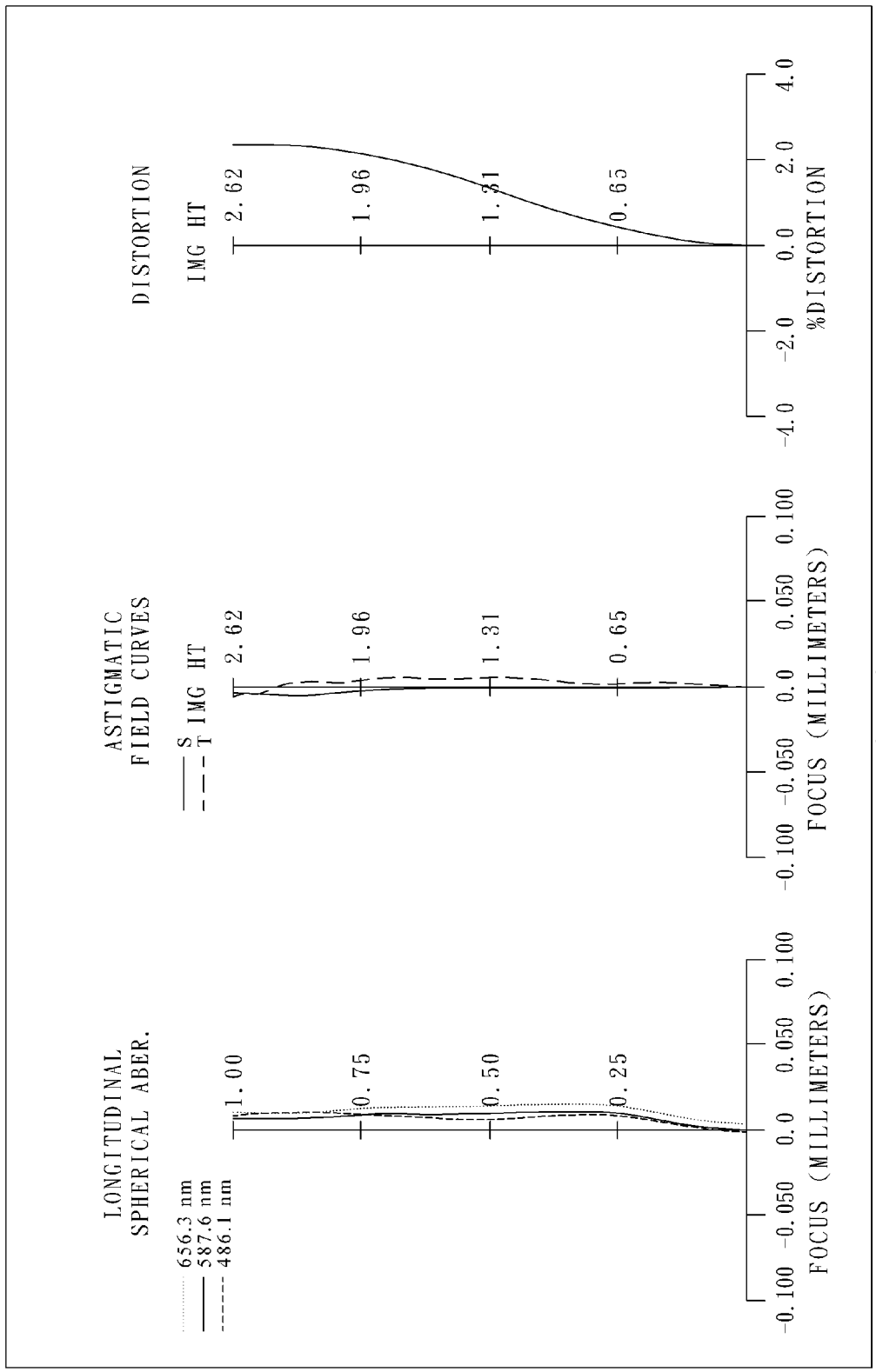
FIG. 1B shows longitudinal spherical aberration curves, astigmatic field curves and a distortion curve of the image capturing apparatus according to the 1st embodiment.

FIG. 1A is a schematic view of an image capturing apparatus according to the 1st embodiment of the present disclosure. FIG. 1B shows, in order from left to right, longitudinal spherical aberration curves, astigmatic field curves and a distortion curve of the image capturing apparatus according to the 1st embodiment.

In FIG. 1A, the image capturing apparatus comprises an imaging lens assembly (not otherwise herein labeled) of the present disclosure and an image sensor 190. The imaging lens assembly comprises, in order from an object side to an image side, a first lens element 110, an aperture stop 100, a second lens element 120, a third lens element 130, a fourth lens element 140, a fifth lens element 150, and a sixth lens element 160, wherein each of the first through sixth lens elements (110-160) is a single and non-cemented lens element.

The first lens element 110 with positive refractive power has an object-side surface 111 being convex in a paraxial region thereof and an image-side surface 112 being convex in a paraxial region thereof, which are both aspheric, and the first lens element 110 is made of plastic.

The second lens element 120 with negative refractive power has an object-side surface 121 being concave in a paraxial region thereof and an image-side surface 122 being convex in a paraxial region thereof, which are both aspheric, and the second lens element 120 is made of plastic. Moreover, the object-side surface 121 or the image-side surface 122 has at least one critical point in an off-axial region.

The third lens element 130 with negative refractive power has an object-side surface 131 being convex in a paraxial region thereof and an image-side surface 132 being concave in a paraxial region thereof, which are both aspheric, and the third lens element 130 is made of plastic.

The fourth lens element 140 with positive refractive power has an object-side surface 141 being convex in a paraxial region thereof and an image-side surface 142 being concave in a paraxial region thereof, which are both aspheric, and the fourth lens element 140 is made of plastic.

The fifth lens element 150 with negative refractive power has an object-side surface 151 being concave in a paraxial region thereof and an image-side surface 152 being concave in a paraxial region thereof, which are both aspheric, and the fifth lens element 150 is made of plastic.

The sixth lens element 160 with positive refractive power has an object-side surface 161 being convex in a paraxial region thereof and an image-side surface 162 being concave in a paraxial region thereof, which are both aspheric, and the sixth lens element 160 is made of plastic. Moreover, the image-side surface 162 has a convex shape in an off-axial region; the object-side surface 161 or the image-side surface 162 has at least one inflection point in an off-axial region.

The imaging lens assembly further comprises a filter 170 located between the sixth lens element 160 and an image surface 180. The filter 170 is made of glass and does not affect the focal length of the imaging lens assembly. The image sensor 190 is disposed on or near the image surface 180 of the imaging lens assembly.

The detailed optical data of the 1st embodiment are shown in TABLE 1, wherein the units of the curvature radius, the thickness and the focal length are expressed in mm, and surfaces #0 to #16 refer to the surfaces in order from the object side to the image side. The aspheric surface data of the 1st embodiment are shown in TABLE 2, wherein k is the conic coefficient in the equation of the aspheric surface profiles, and A4-A16 refer to the 4th to 16th order aspheric coefficients. Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1 and TABLE 2 for the 1st embodiment; explanations in this regard will not be provided again.

TABLE 1

(1st Embodiment)
f = 4.90 mm, Fno = 2.50, HFOV = 27.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.469 | ASP | 0.740 | Plastic | 1.545 | 56.0 | 2.62 |
| 2 | | −41.738 | ASP | 0.071 | | | | |
| 3 | Ape. Stop | Plano | | 0.050 | | | | |
| 4 | Lens 2 | −5.689 | ASP | 0.210 | Plastic | 1.660 | 20.4 | −8.94 |
| 5 | | −161.970 | ASP | 0.091 | | | | |
| 6 | Lens 3 | 3.525 | ASP | 0.250 | Plastic | 1.639 | 23.5 | −6.91 |
| 7 | | 1.905 | ASP | 0.802 | | | | |
| 8 | Lens 4 | 10.294 | ASP | 0.365 | Plastic | 1.660 | 20.4 | 51.18 |
| 9 | | 14.598 | ASP | 0.538 | | | | |
| 10 | Lens 5 | −86.857 | ASP | 0.342 | Plastic | 1.545 | 56.0 | −6.19 |
| 11 | | 3.510 | ASP | 0.062 | | | | |
| 12 | Lens 6 | 2.557 | ASP | 0.602 | Plastic | 1.642 | 22.5 | 16.07 |
| 13 | | 3.088 | ASP | 0.300 | | | | |
| 14 | Filter | Plano | | 0.210 | Glass | 1.517 | 64.2 | — |
| 15 | | Plano | | 0.389 | | | | |
| 16 | Image | Plano | | — | | | | |

Note:
Reference wavelength is 587.6 nm.
The effective radius on surface #9 is 1.280 mm.

TABLE 2

Aspheric Coefficients

| Surface # | | | | | |
|---|---|---|---|---|---|
| 1 | 2 | 4 | 5 | 6 | 7 |
| k = −8.9578E−01 | 9.0000E+01 | −6.1064E+00 | 9.0000E+01 | −5.2682E+01 | −4.4322E+00 |
| A4 = 2.8975E−02 | 8.1348E−02 | 2.9941E−01 | 1.8900E−01 | −9.7909E−02 | −1.0358E−01 |
| A6 = 1.0889E−02 | −1.6126E−01 | −4.7137E−01 | −1.4466E−01 | 2.3817E−01 | 3.7538E−01 |
| A8 = −2.1823E−02 | 1.3303E−01 | 7.2990E−01 | 5.2692E−01 | −6.4523E−02 | −4.3220E−01 |
| A10 = 2.1205E−02 | −7.1162E−02 | −5.5653E−01 | −3.7483E−01 | 4.1571E−02 | 3.9484E−01 |
| A12 = −1.7592E−02 | 1.3586E−02 | 1.8673E−01 | 2.3072E−01 | −2.4274E−02 | −2.0269E−01 |

| Surface # | | | | | |
|---|---|---|---|---|---|
| 8 | 9 | 10 | 11 | 12 | 13 |
| k = 4.2971E+01 | 8.8453E+01 | −1.0000E+00 | −9.4271E−03 | −9.9717E+00 | −1.1005E+01 |
| A4 = −9.3035E−02 | −7.9168E−02 | 6.8759E−02 | −4.1894E−02 | −1.8162E−01 | −1.3745E−01 |
| A6 = −3.1454E−02 | −6.1501E−02 | −2.7183E−01 | −7.3129E−02 | 1.4926E−01 | 8.3284E−02 |
| A8 = 9.1459E−02 | 1.2290E−01 | 2.4101E−01 | 6.3341E−02 | −9.3318E−02 | −4.0537E−02 |

TABLE 2-continued

| Aspheric Coefficients | | | | | | |
|---|---|---|---|---|---|---|
| A10 = | −1.4020E−01 | −1.2426E−01 | −1.2343E−01 | −3.1045E−02 | 3.7236E−02 | 1.3317E−02 |
| A12 = | 1.0606E−01 | 6.4762E−02 | 3.0868E−02 | 7.6548E−03 | −8.8791E−03 | −2.6206E−03 |
| A14 = | −2.8945E−02 | −1.2202E−02 | −2.5720E−03 | −7.8085E−04 | 1.1654E−03 | 2.7514E−04 |
| A16 = | | | | | −6.4522E−05 | −1.1666E−05 |

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, a focal length of the imaging lens assembly is f, an f-number of the imaging lens assembly is Fno, half of a maximum field of view of the imaging lens assembly is HFOV, and these parameters have the following values: f=4.90 mm; Fno=2.50; HFOV=27.5 degrees.

In the 1st embodiment, an Abbe number of the sixth lens element 160 is V6, and it satisfies the condition: V6=22.5.

In the 1st embodiment, an axial distance between the second lens element 120 and the third lens element 130 is T23, a central thickness of the second lens element 120 is CT2, a central thickness of the third lens element 130 is CT3, and they satisfy the condition: T23/(CT2+CT3)=0.20.

In the 1st embodiment, an axial distance between the third lens element 130 and the fourth lens element 140 is T34, an axial distance between the image-side surface 162 of the sixth lens element 160 and the image surface 180 is BL, and they satisfy the condition: T34/BL=0.89.

In the 1st embodiment, a sum of axial distances between every two adjacent lens elements of the imaging lens assembly is ΣAT, the axial distance between the third lens element 130 and the fourth lens element 140 is T34, and they satisfy the condition: ΣAT/T34=2.01.

In the 1st embodiment, a central thickness of the fifth lens element 150 is CT5, a central thickness of the sixth lens element 160 is CT6, and they satisfy the condition: CT5/CT6=0.57.

In the 1st embodiment, an axial distance between the object-side surface 111 of the first lens element 110 and the image-side surface 162 of the sixth lens element 160 is Td, the sum of axial distances between every two adjacent lens elements of the imaging lens assembly is ΣAT, and they satisfy the condition: Td/ΣAT=2.55.

In the 1st embodiment, a curvature radius of the object-side surface 121 of the second lens element 120 is R3, a curvature radius of the image-side surface 122 of the second lens element 120 is R4, and they satisfy the condition: (R3+R4)/(R3−R4)=−1.07.

In the 1st embodiment, a focal length of the first lens element 110 is f1, a focal length of the second lens element 120 is f2, and they satisfy the condition: |f1/f2|=0.29.

In the 1st embodiment, a focal length of the fifth lens element 150 is f5, a focal length of the sixth lens element 160 is f6, and they satisfy the condition: |f5/f6|=0.39.

In the 1st embodiment, the focal length of the imaging lens assembly is f, the axial distance between the image-side surface 162 of the sixth lens element 160 and the image surface 180 is BL, and they satisfy the condition: f/BL=5.45.

In the 1st embodiment, the focal length of the imaging lens assembly is f, the focal length of the fifth lens element 150 is f5, and they satisfy the condition: f/f5=−0.79.

2nd Embodiment

Figure 2A:
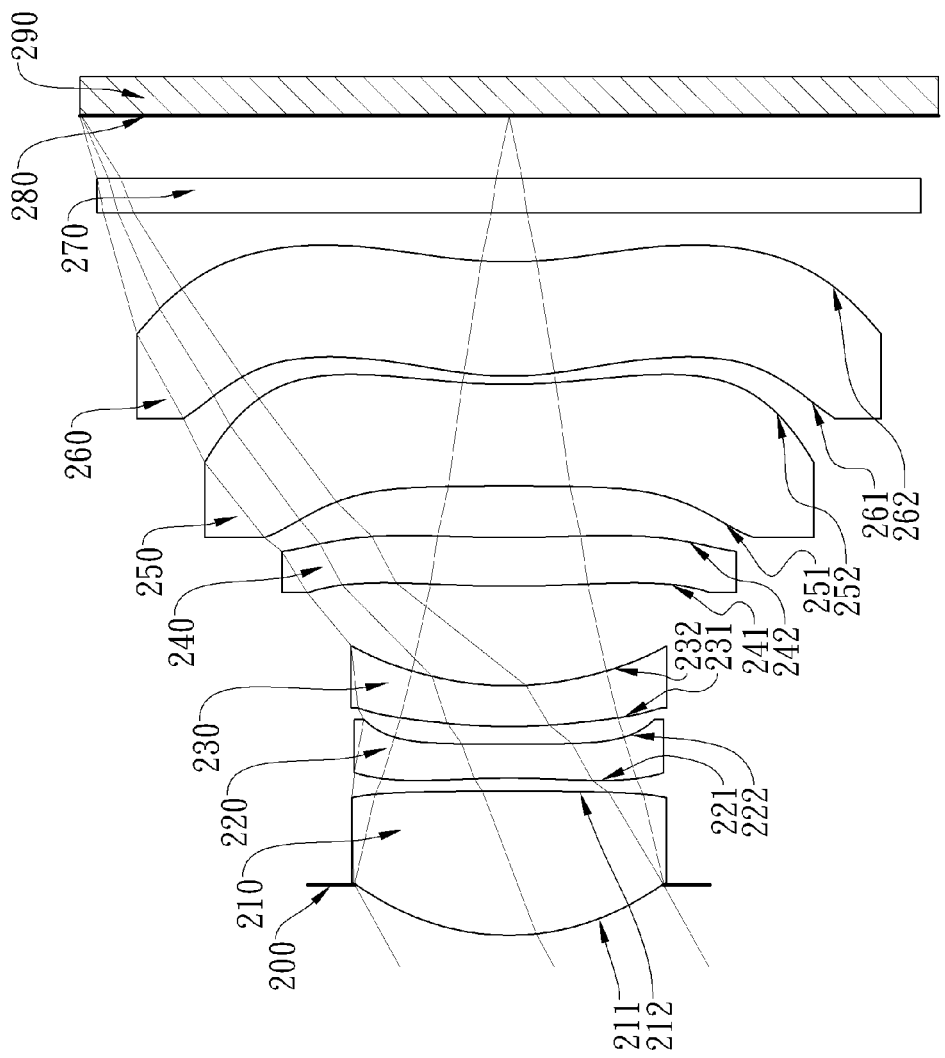
FIG. 2A is a schematic view of an image capturing apparatus according to the 2nd embodiment of the present disclosure.
Figure 2B:
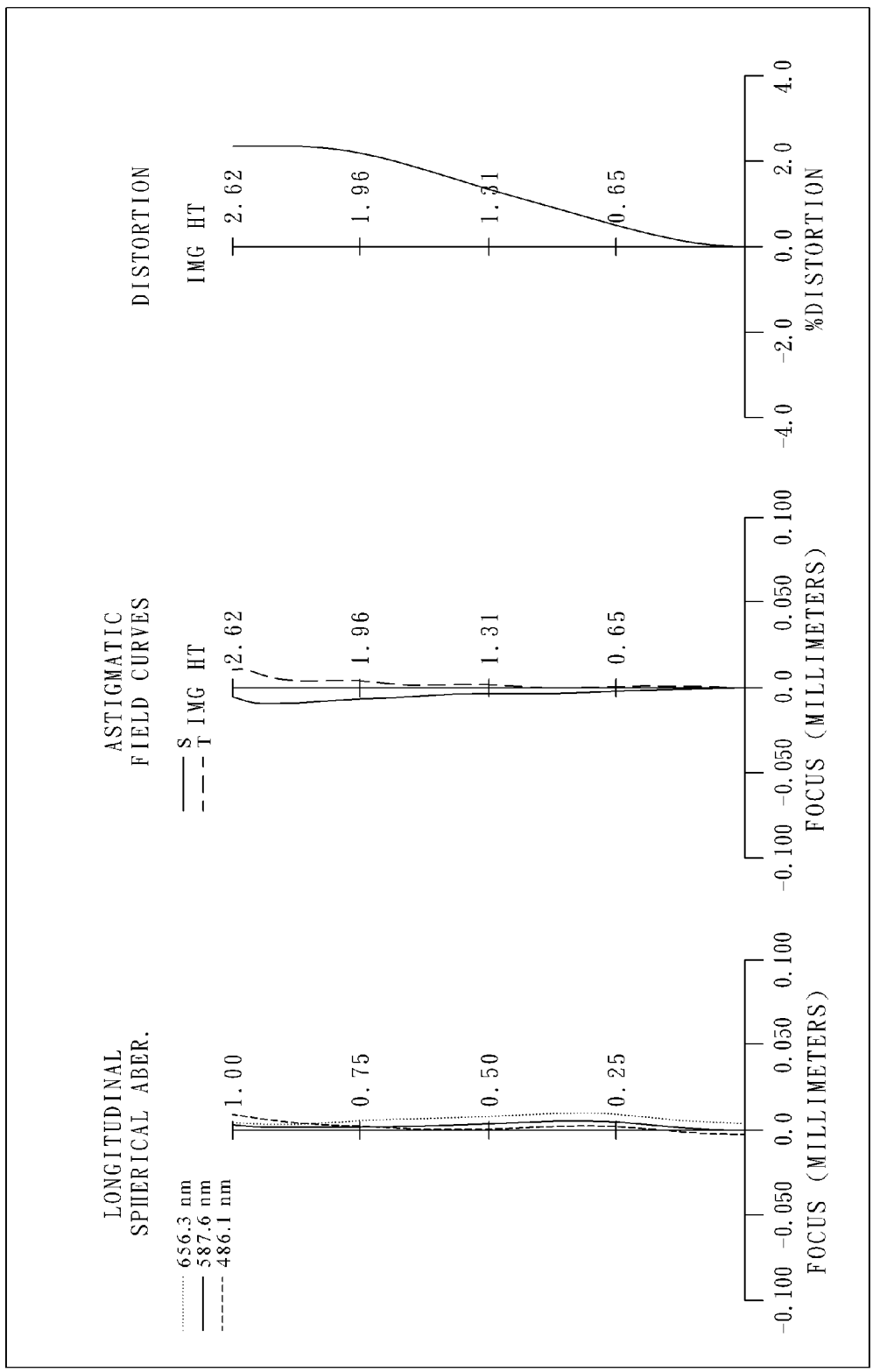
FIG. 2B shows longitudinal spherical aberration curves, astigmatic field curves and a distortion curve of the image capturing apparatus according to the 2nd embodiment.

FIG. 2A is a schematic view of an image capturing apparatus according to the 2nd embodiment of the present disclosure. FIG. 2B shows, in order from left to right, longitudinal spherical aberration curves, astigmatic field curves and a distortion curve of the image capturing apparatus according to the 2nd embodiment.

In FIG. 2A, the image capturing apparatus comprises an imaging lens assembly (not otherwise herein labeled) of the present disclosure and an image sensor 290. The imaging lens assembly comprises, in order from an object side to an image side, an aperture stop 200, a first lens element 210, a second lens element 220, a third lens element 230, a fourth lens element 240, a fifth lens element 250, and a sixth lens element 260, wherein each of the first through sixth lens elements (210-260) is a single and non-cemented lens element.

The first lens element 210 with positive refractive power has an object-side surface 211 being convex in a paraxial region thereof and an image-side surface 212 being convex in a paraxial region thereof, which are both aspheric, and the first lens element 210 is made of plastic.

The second lens element 220 with negative refractive power has an object-side surface 221 being concave in a paraxial region thereof and an image-side surface 222 being convex in a paraxial region thereof, which are both aspheric, and the second lens element 220 is made of plastic. Moreover, the object-side surface 221 or the image-side surface 222 has at least one critical point in an off-axial region.

The third lens element 230 with negative refractive power has an object-side surface 231 being convex in a paraxial region thereof and an image-side surface 232 being concave in a paraxial region thereof, which are both aspheric, and the third lens element 230 is made of plastic.

The fourth lens element 240 with positive refractive power has an object-side surface 241 being convex in a paraxial region thereof and an image-side surface 242 being concave in a paraxial region thereof, which are both aspheric, and the fourth lens element 240 is made of plastic.

The fifth lens element 250 with negative refractive power has an object-side surface 251 being concave in a paraxial region thereof and an image-side surface 252 being concave in a paraxial region thereof, which are both aspheric, and the fifth lens element 250 is made of plastic.

The sixth lens element 260 with positive refractive power has an object-side surface 261 being convex in a paraxial region thereof and an image-side surface 262 being concave in a paraxial region thereof, which are both aspheric, and the sixth lens element 260 is made of plastic. Moreover, the image-side surface 262 has a convex shape in an off-axial region. The object-side surface 261 or the image-side surface 262 has at least one inflection point in an off-axial region.

The imaging lens assembly further comprises a filter 270 located between the sixth lens element 260 and an image surface 280. The filter 270 is made of glass and does not affect the focal length of the imaging lens assembly. The image sensor 290 is disposed on or near the image surface 280 of the imaging lens assembly.

The detailed optical data of the 2nd embodiment (as illustrated in FIG. 2A) are shown in TABLE 3, wherein the units of the curvature radius, the thickness and the focal length are expressed in mm, and surfaces #0 to #16 refer to the surfaces in order from the object side to the image side. The aspheric surface data of the 2nd embodiment are shown in TABLE 4, wherein k is the conic coefficient in the equation of the aspheric surface profiles, and A4-A16 refer to the 4th to 16th order aspheric coefficients.

TABLE 3

(2nd Embodiment)
f = 4.63 mm, Fno = 2.45, HFOV = 28.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.309 | | | | |
| 2 | Lens 1 | 1.514 | ASP | 0.885 | Plastic | 1.545 | 56.1 | 2.58 |
| 3 | | −15.408 | ASP | 0.078 | | | | |
| 4 | Lens 2 | −4.597 | ASP | 0.210 | Plastic | 1.660 | 20.4 | −8.02 |
| 5 | | −35.585 | ASP | 0.106 | | | | |
| 6 | Lens 3 | 2.999 | ASP | 0.250 | Plastic | 1.634 | 23.8 | −7.21 |
| 7 | | 1.752 | ASP | 0.610 | | | | |
| 8 | Lens 4 | 6.948 | ASP | 0.299 | Plastic | 1.660 | 20.4 | 56.63 |
| 9 | | 8.389 | ASP | 0.315 | | | | |
| 10 | Lens 5 | −19.488 | ASP | 0.624 | Plastic | 1.545 | 56.1 | −5.38 |
| 11 | | 3.488 | ASP | 0.050 | | | | |
| 12 | Lens 6 | 1.867 | ASP | 0.700 | Plastic | 1.584 | 28.2 | 8.73 |
| 13 | | 2.537 | ASP | 0.300 | | | | |
| 14 | Filter | Plano | | 0.210 | Glass | 1.517 | 64.2 | — |
| 15 | | Plano | | 0.385 | | | | |
| 16 | Image | Plano | | — | | | | |

Note:
Reference wavelength is 587.6 nm.

TABLE 4

Aspheric Coefficients

| | | | Surface # | | | |
|---|---|---|---|---|---|---|
| | 2 | 3 | 4 | 5 | 6 | 7 |
| k = | −9.7084E−01 | 9.0000E+01 | 2.4035E+00 | 9.0000E+01 | −2.8279E+01 | −4.9938E+00 |
| A4 = | 2.7857E−02 | 7.7381E−02 | 2.7629E−01 | 1.8787E−01 | −6.5150E−02 | −4.8168E−02 |
| A6 = | 1.0022E−02 | −1.9465E−01 | −4.1026E−01 | −1.2745E−01 | 1.0187E−01 | 1.8532E−01 |
| A8 = | −2.3325E−02 | 2.4808E−01 | 6.8557E−01 | 3.9670E−01 | −3.6501E−02 | −2.0442E−01 |
| A10 = | 2.4240E−02 | −2.1212E−01 | −5.7092E−01 | −2.4125E−01 | 8.5724E−02 | 1.8812E−01 |
| A12 = | −1.7240E−02 | 6.7517E−02 | 1.8481E−01 | 1.0748E−01 | −5.1267E−02 | −8.4147E−02 |

| | | | Surface # | | | |
|---|---|---|---|---|---|---|
| | 8 | 9 | 10 | 11 | 12 | 13 |
| k = | 2.3921E+01 | 2.9845E+01 | −9.0000E+01 | 2.1188E+00 | −8.0998E+00 | −1.6175E−01 |
| A4 = | −7.8513E−02 | −7.1464E−02 | 3.9031E−02 | −1.1120E−01 | −1.0866E−01 | −1.3182E−01 |
| A6 = | 1.7737E−03 | −4.9766E−02 | −1.9541E−01 | 1.0735E−02 | 1.0862E−02 | 3.0986E−02 |
| A8 = | 2.4494E−02 | 9.1127E−02 | 1.7506E−01 | 1.9644E−02 | 3.8472E−02 | −2.1782E−03 |
| A10 = | −3.7956E−02 | −7.3889E−02 | −9.9087E−02 | −1.7957E−02 | −2.9058E−02 | −1.6731E−03 |
| A12 = | 1.9013E−02 | 2.9946E−02 | 3.2607E−02 | 5.1302E−03 | 8.5550E−03 | 5.4723E−04 |
| A14 = | −3.7666E−03 | −4.6073E−03 | −4.2406E−03 | −5.1213E−04 | −1.1358E−03 | −7.2539E−05 |
| A16 = | | | | | 5.6780E−05 | 3.8321E−06 |

In the 2nd embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 2nd embodiment are as specified below.

| 2nd Embodiment | | | |
|---|---|---|---|
| f [mm] | 4.63 | CT5/CT6 | 0.89 |
| Fno | 2.45 | Td/ΣAT | 3.56 |
| HFOV [deg.] | 28.9 | (R3 + R4)/(R3 − R4) | −1.30 |
| V6 | 28.2 | |f1/f2| | 0.32 |
| T23/(CT2 + CT3) | 0.23 | |f5/f6| | 0.62 |
| T34/BL | 0.68 | f/BL | 5.17 |
| ΣAT/T34 | 1.90 | f/f5 | −0.86 |

3rd Embodiment

Figure 3A:
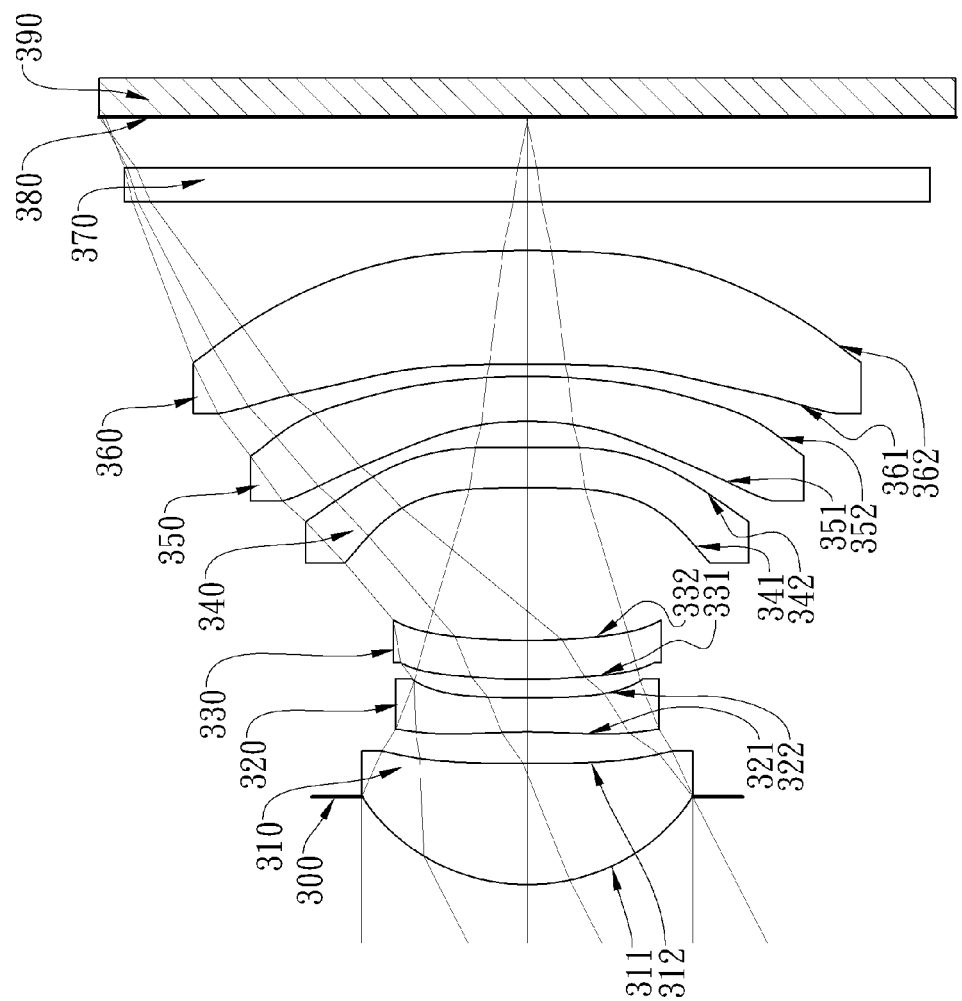
FIG. 3A is a schematic view of an image capturing apparatus according to the 3rd embodiment of the present disclosure.
Figure 3B:
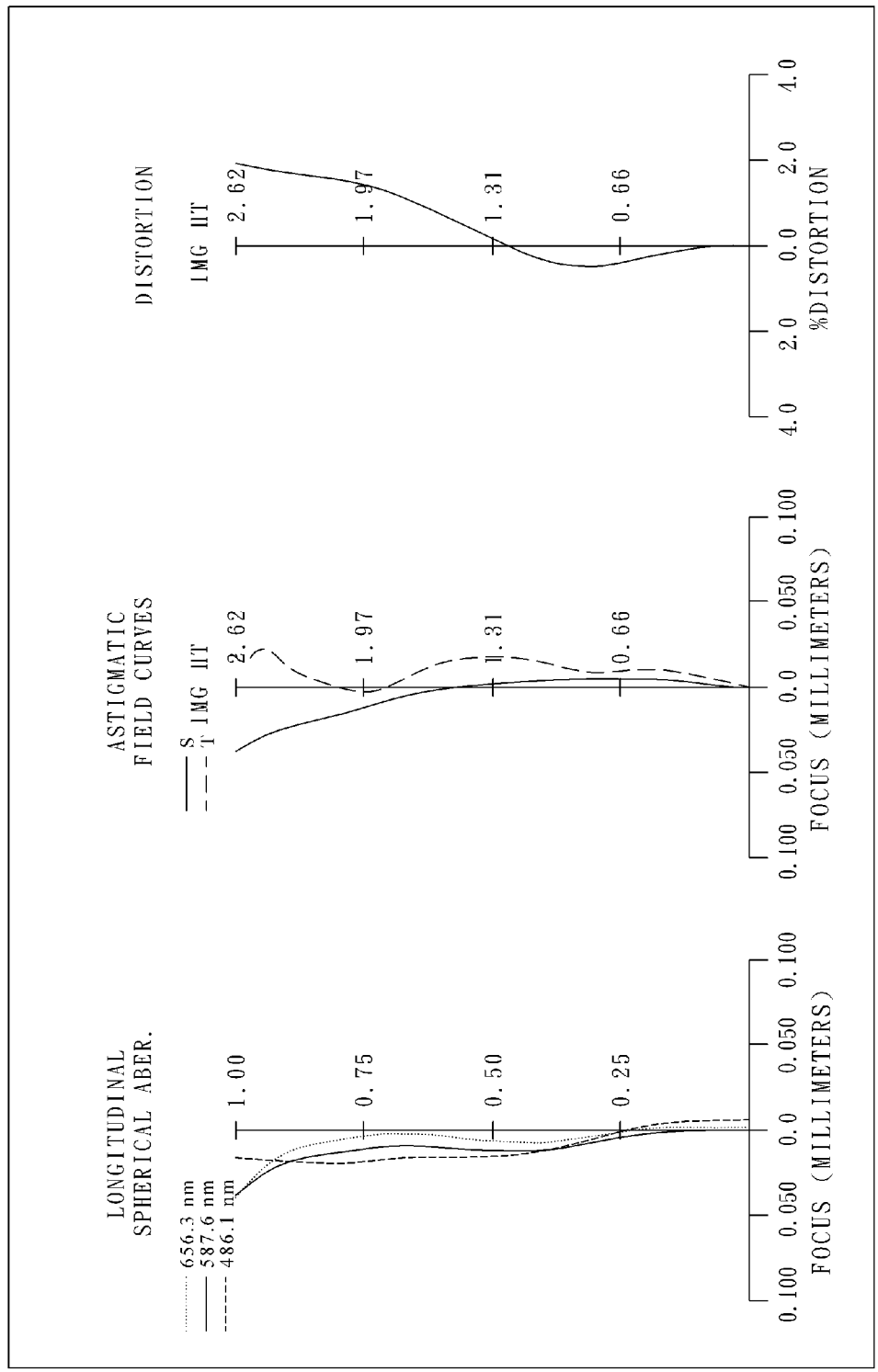
FIG. 3B shows longitudinal spherical aberration curves, astigmatic field curves and a distortion curve of the image capturing apparatus according to the 3rd embodiment.

FIG. 3A is a schematic view of an image capturing apparatus according to the 3rd embodiment of the present disclosure. FIG. 3B shows, in order from left to right, longitudinal spherical aberration curves, astigmatic field curves and a distortion curve of the image capturing apparatus according to the 3rd embodiment.

In FIG. 3A, the image capturing apparatus comprises an imaging lens assembly (not otherwise herein labeled) of the present disclosure and an image sensor 390. The imaging lens assembly comprises, in order from an object side to an image side, an aperture stop 300, a first lens element 310, a second lens element 320, a third lens element 330, a fourth lens element 340, a fifth lens element 350, and a sixth lens element 360, wherein each of the first through sixth lens elements (310-360) is a single and non-cemented lens element.

The first lens element 310 with positive refractive power has an object-side surface 311 being convex in a paraxial region thereof and an image-side surface 312 being concave in a paraxial region thereof, which are both aspheric, and the first lens element 310 is made of plastic.

The second lens element 320 with negative refractive power has an object-side surface 321 being concave in a paraxial region thereof and an image-side surface 322 being concave in a paraxial region thereof, which are both aspheric, and the second lens element 320 is made of plastic. Moreover, the object-side surface 321 or the image-side surface 322 has at least one critical point in an off-axial region.

The third lens element 330 with positive refractive power has an object-side surface 331 being convex in a paraxial region thereof and an image-side surface 332 being concave in a paraxial region thereof, which are both aspheric, and the third lens element 330 is made of plastic.

The fourth lens element 340 with negative refractive power has an object-side surface 341 being concave in a paraxial region thereof and an image-side surface 342 being concave in a paraxial region thereof, which are both aspheric, and the fourth lens element 340 is made of plastic.

The fifth lens element 350 with negative refractive power has an object-side surface 351 being concave in a paraxial region thereof and an image-side surface 352 being convex in a paraxial region thereof, which are both aspheric, and the fifth lens element 350 is made of plastic.

The sixth lens element 360 with positive refractive power has an object-side surface 361 being concave in a paraxial region thereof and an image-side surface 362 being convex in a paraxial region thereof, which are both aspheric, and the sixth lens element 360 is made of plastic. Moreover, the object-side surface 361 or the image-side surface 362 has at least one inflection point in an off-axial region.

The imaging lens assembly further comprises a filter 370 located between the sixth lens element 360 and an image surface 380. The filter 370 is made of glass and does not affect the focal length of the imaging lens assembly. The image sensor 390 is disposed on or near the image surface 380 of the imaging lens assembly.

The detailed optical data of the 3rd embodiment (as illustrated in FIG. 3A) are shown in TABLE 5, wherein the units of the curvature radius, the thickness and the focal length are expressed in mm, and surfaces #0 to #16 refer to the surfaces in order from the object side to the image side. The aspheric surface data of the 3rd embodiment are shown in TABLE 6, wherein k is the conic coefficient in the equation of the aspheric surface profiles, and A4-A16 refer to the 4th to 16th order aspheric coefficients.

TABLE 5

(3rd Embodiment)
f = 5.05 mm, Fno = 2.48, HFOV = 27.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.540 | | | | |
| 2 | Lens 1 | 1.238 | ASP | 0.744 | Plastic | 1.544 | 55.9 | 2.46 |
| 3 | | 12.996 | ASP | 0.195 | | | | |
| 4 | Lens 2 | −3.846 | ASP | 0.210 | Plastic | 1.660 | 20.4 | −4.03 |
| 5 | | 8.836 | ASP | 0.113 | | | | |
| 6 | Lens 3 | 2.965 | ASP | 0.240 | Plastic | 1.544 | 55.9 | 35.35 |
| 7 | | 3.406 | ASP | 0.940 | | | | |
| 8 | Lens 4 | −17.762 | ASP | 0.250 | Plastic | 1.660 | 20.4 | −14.82 |
| 9 | | 21.874 | ASP | 0.160 | | | | |
| 10 | Lens 5 | −2.019 | ASP | 0.277 | Plastic | 1.544 | 55.9 | −9.09 |
| 11 | | −3.576 | ASP | 0.073 | | | | |
| 12 | Lens 6 | −18.260 | ASP | 0.700 | Plastic | 1.660 | 20.4 | 80.07 |
| 13 | | −13.778 | ASP | 0.300 | | | | |
| 14 | Filter | Plano | | 0.210 | Glass | 1.517 | 64.2 | — |

TABLE 5-continued (3rd Embodiment)
f = 5.05 mm, Fno = 2.48, HFOV = 27.0 deg.

| Surface # | | Curvature Radius | Thickness | Material | Index | Abbe # | Focal Length |
|---|---|---|---|---|---|---|---|
| 15 | | Plano | 0.311 | | | | |
| 16 | Image | Plano | — | | | | |

Note:
Reference wavelength is 587.6 nm.
The effective radius on surface #5 is 0.710 mm.
The effective radius on surface #6 is 0.780 mm.

TABLE 6

Aspheric Coefficients

| | | | Surface # | | | |
|---|---|---|---|---|---|---|
| | 2 | 3 | 4 | 5 | 6 | 7 |
| k = | −2.9491E−01 | 9.0000E+01 | −3.9686E+01 | 3.4928E+01 | −8.5381E+01 | 1.0341E+00 |
| A4 = | 1.9821E−02 | 7.1345E−02 | 3.3661E−01 | 2.6993E−01 | 3.4788E−02 | −1.7544E−01 |
| A6 = | 2.0380E−03 | 6.1649E−02 | −4.1403E−01 | 6.8333E−03 | −3.7715E−01 | 5.1046E−01 |
| A8 = | 3.7921E−02 | −2.4561E−01 | 5.5608E−01 | −2.7816E−01 | 1.3738E+00 | −8.0723E−01 |
| A10 = | −4.0955E−02 | 4.0071E−01 | −3.3912E−01 | 2.0086E+00 | −5.3600E−01 | 1.5093E+00 |
| A12 = | 3.2568E−02 | −2.4713E−01 | −9.9135E−02 | −1.8982E+00 | −4.8671E−01 | −1.0378E+00 |

| | | | Surface # | | | |
|---|---|---|---|---|---|---|
| | 8 | 9 | 10 | 11 | 12 | 13 |
| k = | 2.0024E+01 | −2.0642E+01 | −1.1160E+01 | −3.9027E+01 | 7.5376E+01 | −8.9463E+01 |
| A4 = | −3.8486E−01 | −5.3968E−01 | −4.0499E−01 | 4.5015E−02 | 1.3953E−03 | −1.3305E−01 |
| A6 = | 3.6045E−01 | 6.4155E−01 | 6.0911E−01 | −2.6138E−01 | −2.2789E−01 | 9.1354E−02 |
| A8 = | −6.8416E−01 | −5.8771E−01 | −4.2311E−01 | 3.0086E−01 | 2.9621E−01 | −5.1151E−02 |
| A10 = | 6.8026E−01 | 3.4634E−01 | 1.4101E−01 | −1.5496E−01 | −1.6612E−01 | 2.0536E−02 |
| A12 = | −3.4679E−01 | −1.0798E−01 | −1.9129E−02 | 3.6473E−02 | 4.8000E−02 | −5.1334E−03 |
| A14 = | 8.2347E−02 | 1.3404E−02 | 4.4604E−04 | −3.1809E−03 | −7.0116E−03 | 6.8421E−04 |
| A16 = | | | | | 4.1144E−04 | −3.6282E−05 |

In the 3rd embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 3rd embodiment are as specified below.

| 3rd Embodiment | | | |
|---|---|---|---|
| f [mm] | 5.05 | CT5/CT6 | 0.40 |
| Fno | 2.48 | Td/ΣAT | 2.63 |
| HFOV [deg.] | 27.0 | (R3 + R4)/(R3 − R4) | −0.39 |
| V6 | 20.4 | |f1/f2| | 0.61 |
| T23/(CT2 + CT3) | 0.25 | |f5/f6| | 0.11 |
| T34/BL | 1.14 | f/BL | 6.15 |
| ΣAT/T34 | 1.58 | f/f5 | −0.56 |

4th Embodiment

Figure 4A:
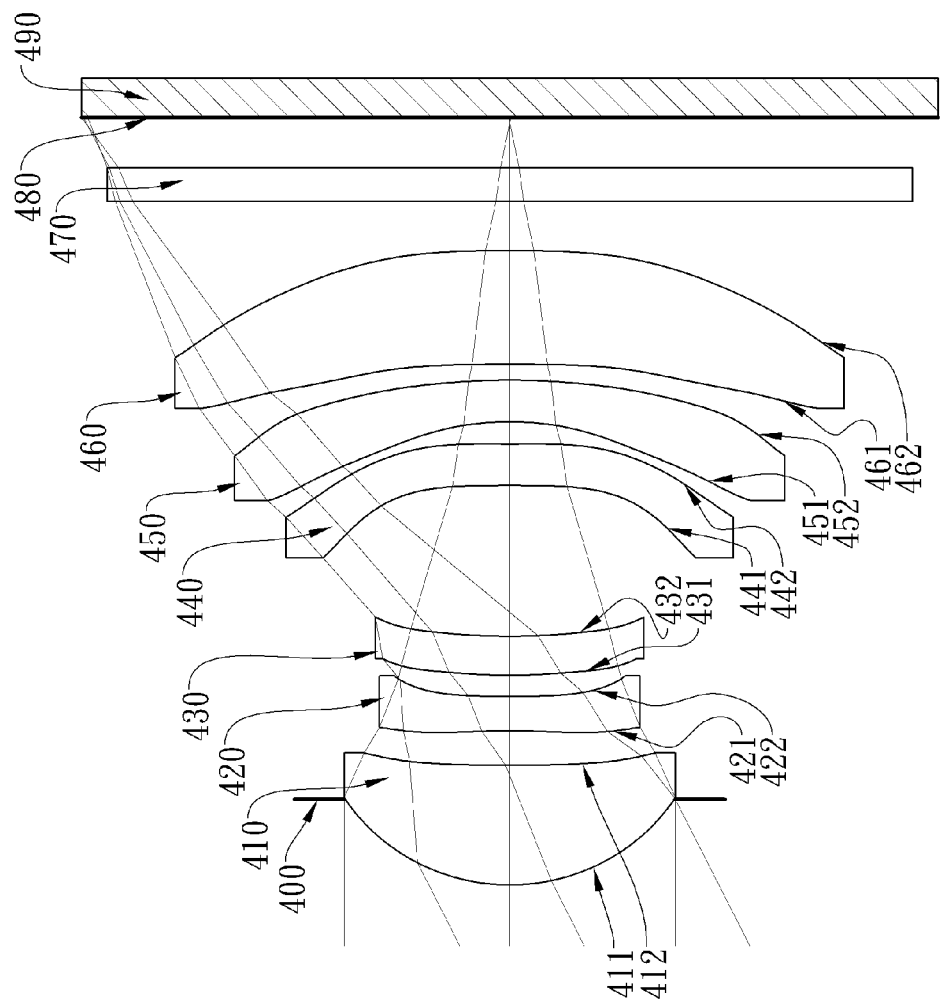
FIG. 4A is a schematic view of an image capturing apparatus according to the 4th embodiment of the present disclosure.
Figure 4B:
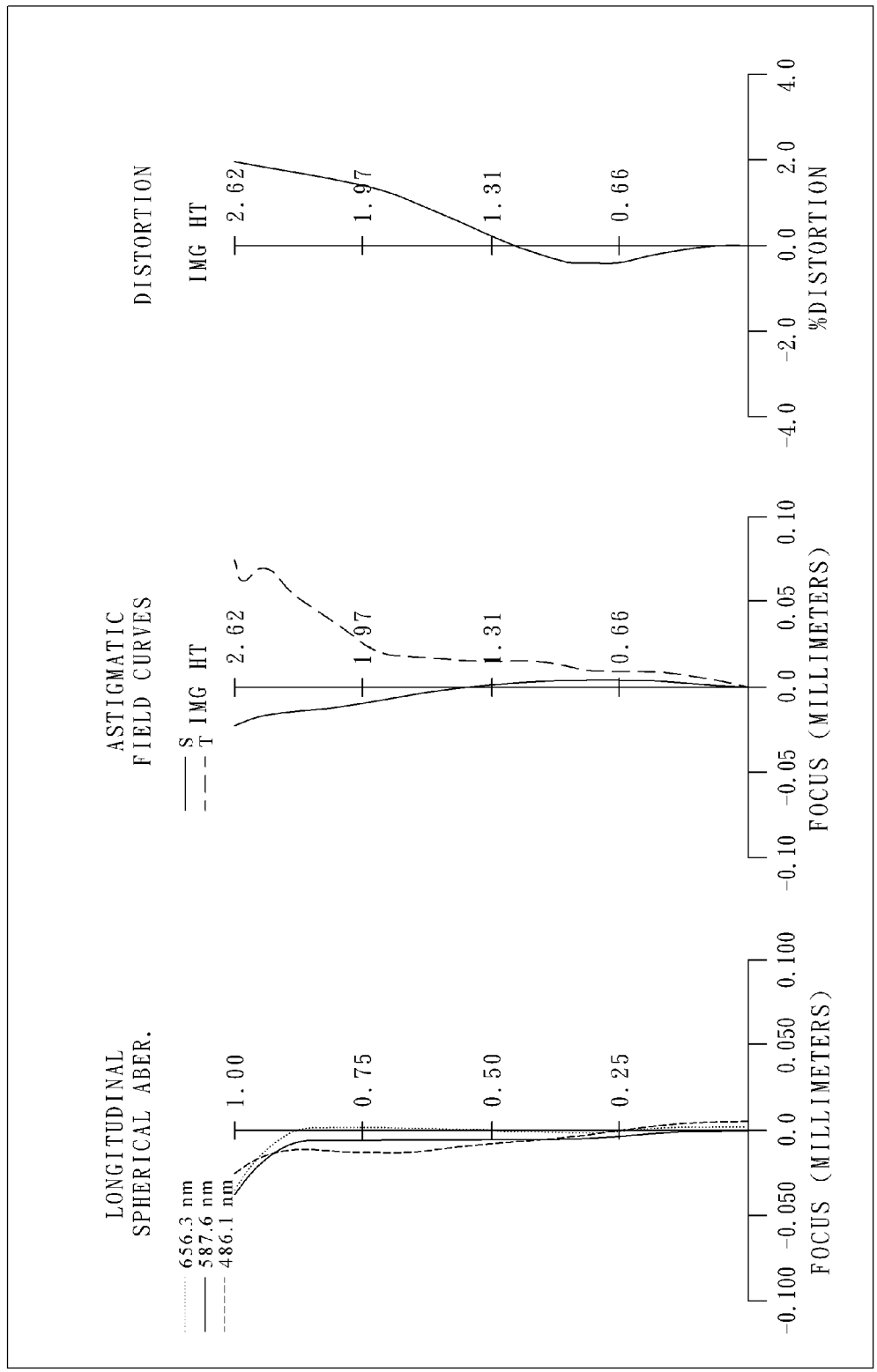
FIG. 4B shows longitudinal spherical aberration curves, astigmatic field curves and a distortion curve of the image capturing apparatus according to the 4th embodiment.

FIG. 4A is a schematic view of an image capturing apparatus according to the 4th embodiment of the present disclosure. FIG. 4B shows, in order from left to right, longitudinal spherical aberration curves, astigmatic field curves and a distortion curve of the image capturing apparatus according to the 4th embodiment.

In FIG. 4A, the image capturing apparatus comprises an imaging lens assembly (not otherwise herein labeled) of the present disclosure and an image sensor 490. The imaging lens assembly comprises, in order from an object side to an image side, an aperture stop 400, a first lens element 410, a second lens element 420, a third lens element 430, a fourth lens element 440, a fifth lens element 450, and a sixth lens element 460, wherein each of the first through sixth lens elements (410-460) is a single and non-cemented lens element.

The first lens element 410 with positive refractive power has an object-side surface 411 being convex in a paraxial region thereof and an image-side surface 412 being concave in a paraxial region thereof, which are both aspheric, and the first lens element 410 is made of plastic.

The second lens element 420 with negative refractive power has an object-side surface 421 being concave in a paraxial region thereof and an image-side surface 422 being concave in a paraxial region thereof, which are both aspheric, and the second lens element 420 is made of plastic. Moreover, the object-side surface 421 or the image-side surface 422 has at least one critical point in an off-axial region.

The third lens element 430 with positive refractive power has an object-side surface 431 being convex in a paraxial region thereof and an image-side surface 432 being concave in a paraxial region thereof, which are both aspheric, and the third lens element 430 is made of plastic.

The fourth lens element 440 with negative refractive power has an object-side surface 441 being concave in a paraxial region thereof and an image-side surface 442 being concave in a paraxial region thereof, which are both aspheric, and the fourth lens element 440 is made of plastic.

The fifth lens element 450 with negative refractive power has an object-side surface 451 being concave in a paraxial region thereof and an image-side surface 452 being convex in a paraxial region thereof, which are both aspheric, and the fifth lens element 450 is made of plastic.

The sixth lens element 460 with positive refractive power has an object-side surface 461 being concave in a paraxial region thereof and an image-side surface 462 being convex in a paraxial region thereof, which are both aspheric, and the sixth lens element 460 is made of plastic. Moreover, the object-side surface 461 or the image-side surface 462 has at least one inflection point in an off-axial region.

The imaging lens assembly further comprises a filter 470 located between the sixth lens element 460 and an image surface 480. The filter 470 is made of glass and does not affect the focal length of the imaging lens assembly. The image sensor 490 is disposed on or near the image surface 480 of the imaging lens assembly.

The detailed optical data of the 4th embodiment (as illustrated in FIG. 4A) are shown in TABLE 7, wherein the units of the curvature radius, the thickness and the focal length are expressed in mm, and surfaces #0 to #16 refer to the surfaces in order from the object side to the image side. The aspheric surface data of the 4th embodiment are shown in TABLE 8, wherein k is the conic coefficient in the equation of the aspheric surface profiles, and A4-A16 refer to the 4th to 16th order aspheric coefficients.

TABLE 7

(4th Embodiment)
f = 5.04 mm, Fno = 2.48, HFOV = 27.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.526 | | | | |
| 2 | Lens 1 | 1.244 | ASP | 0.735 | Plastic | 1.544 | 55.9 | 2.45 |
| 3 | | 14.649 | ASP | 0.213 | | | | |
| 4 | Lens 2 | −3.884 | ASP | 0.210 | Plastic | 1.660 | 20.4 | −3.93 |
| 5 | | 7.992 | ASP | 0.131 | | | | |
| 6 | Lens 3 | 3.057 | ASP | 0.240 | Plastic | 1.544 | 55.9 | 36.39 |
| 7 | | 3.516 | ASP | 0.927 | | | | |
| 8 | Lens 4 | −37.746 | ASP | 0.255 | Plastic | 1.660 | 20.4 | −18.97 |
| 9 | | 18.781 | ASP | 0.137 | | | | |
| 10 | Lens 5 | −1.957 | ASP | 0.257 | Plastic | 1.544 | 55.9 | −7.90 |
| 11 | | −3.761 | ASP | 0.097 | | | | |
| 12 | Lens 6 | −19.436 | ASP | 0.700 | Plastic | 1.660 | 20.4 | 52.83 |
| 13 | | −12.658 | ASP | 0.300 | | | | |
| 14 | Filter | Plano | | 0.210 | Glass | 1.517 | 64.2 | — |
| 15 | | Plano | | 0.309 | | | | |
| 16 | Image | Plano | | — | | | | |

Note:
Reference wavelength is 587.6 nm.
The effective radius on surface #5 is 0.710 mm.
The effective radius on surface #6 is 0.780 mm.

TABLE 8

Aspheric Coefficients

| | Surface # | | | | | |
|---|---|---|---|---|---|---|
| | 2 | 3 | 4 | 5 | 6 | 7 |
| k = | −3.1979E−01 | 5.2374E+01 | −4.4921E+01 | 8.3182E+01 | −8.1627E+01 | −9.9195E−01 |
| A4 = | 1.7202E−02 | 6.4776E−02 | 3.4377E−01 | 3.0312E−01 | 1.2706E−02 | −1.8873E−01 |
| A6 = | 1.1666E−02 | 1.2326E−01 | −3.2796E−01 | −5.5784E−03 | −2.9203E−01 | 5.2108E−01 |
| A8 = | 2.9134E−02 | −3.8247E−01 | 2.3532E−01 | −5.4698E−01 | 1.1708E+00 | −7.9089E−01 |
| A10 = | −4.0448E−02 | 5.3735E−01 | 1.2234E−01 | 2.6910E+00 | −2.7875E−01 | 1.4732E+00 |
| A12 = | 3.4828E−02 | −2.8964E−01 | −3.5306E−01 | −2.5515E+00 | −6.0975E−01 | −1.0048E+00 |

| | Surface # | | | | | |
|---|---|---|---|---|---|---|
| | 8 | 9 | 10 | 11 | 12 | 13 |
| k = | −7.3034E+00 | 1.0323E+01 | −1.3258E+01 | −5.3827E+01 | 8.3656E+01 | −8.4097E+01 |
| A4 = | −3.7957E−01 | −5.5716E−01 | −4.1564E−01 | 3.6423E−02 | −4.2482E−02 | −1.4351E−01 |
| A6 = | 3.3904E−01 | 7.1810E−01 | 6.6113E−01 | −2.2296E−01 | −1.2600E−01 | 1.1160E−01 |
| A8 = | −5.4416E−01 | −6.6101E−01 | −4.8698E−01 | 2.6213E−01 | 2.0365E−01 | −6.7225E−02 |
| A10 = | 4.1291E−01 | 3.6354E−01 | 1.6861E−01 | −1.3856E−01 | −1.2141E−01 | 2.7898E−02 |
| A12 = | −1.2712E−01 | −1.0290E−01 | −2.2743E−02 | 3.3245E−02 | 3.5889E−02 | −7.0769E−03 |
| A14 = | 1.7323E−02 | 1.1593E−02 | 3.1242E−04 | −2.9358E−03 | −5.2742E−03 | 9.5830E−04 |
| A16 = | | | | | 3.0852E−04 | −5.2264E−05 |

In the 4th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 4th embodiment are as specified below.

| 4th Embodiment | | | |
|---|---|---|---|
| f [mm] | 5.04 | CT5/CT6 | 0.37 |
| Fno | 2.48 | Td/ΣAT | 2.59 |
| HFOV [deg.] | 27.0 | (R3 + R4)/(R3 − R4) | −0.35 |
| V6 | 20.4 | \|f1/f2\| | 0.62 |
| T23/(CT2 + CT3) | 0.29 | \|f5/f6\| | 0.15 |
| T34/BL | 1.13 | f/BL | 6.15 |
| ΣAT/T34 | 1.62 | f/f5 | −0.64 |

5th Embodiment

Figure 5A:
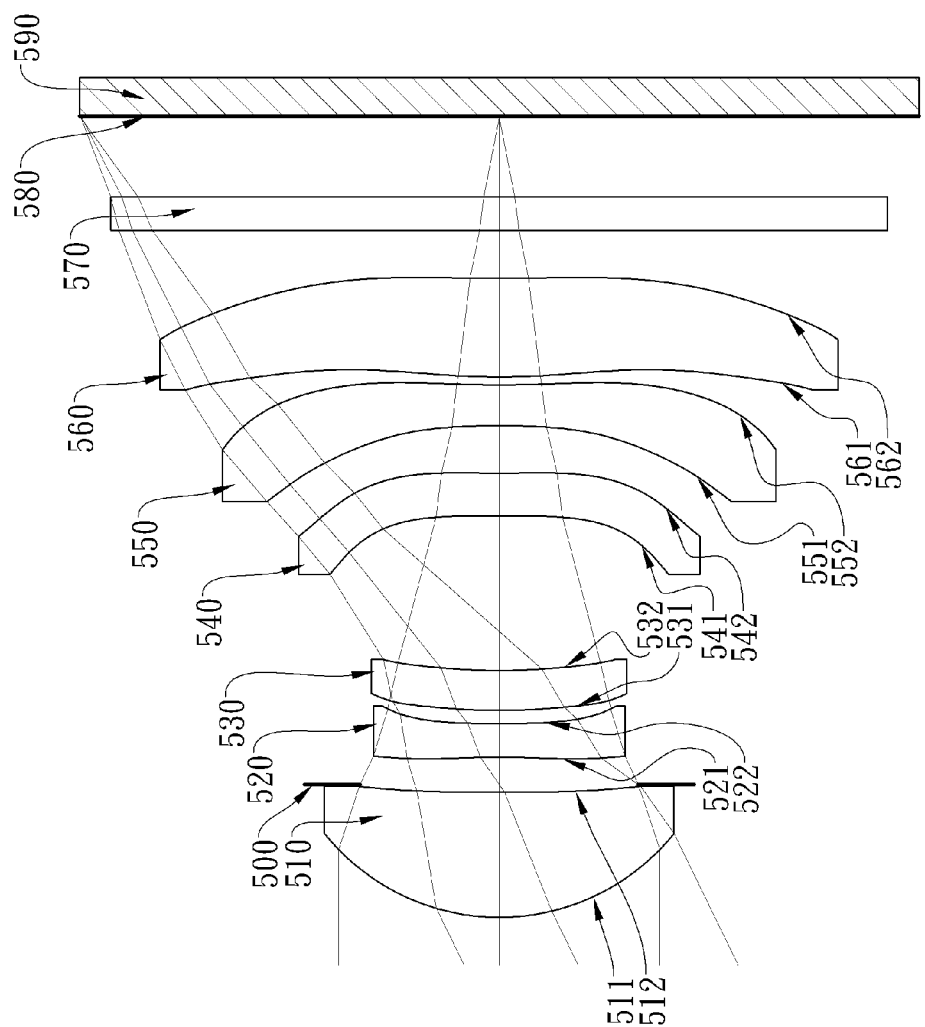
FIG. 5A is a schematic view of an image capturing apparatus according to the 5th embodiment of the present disclosure.
Figure 5B:
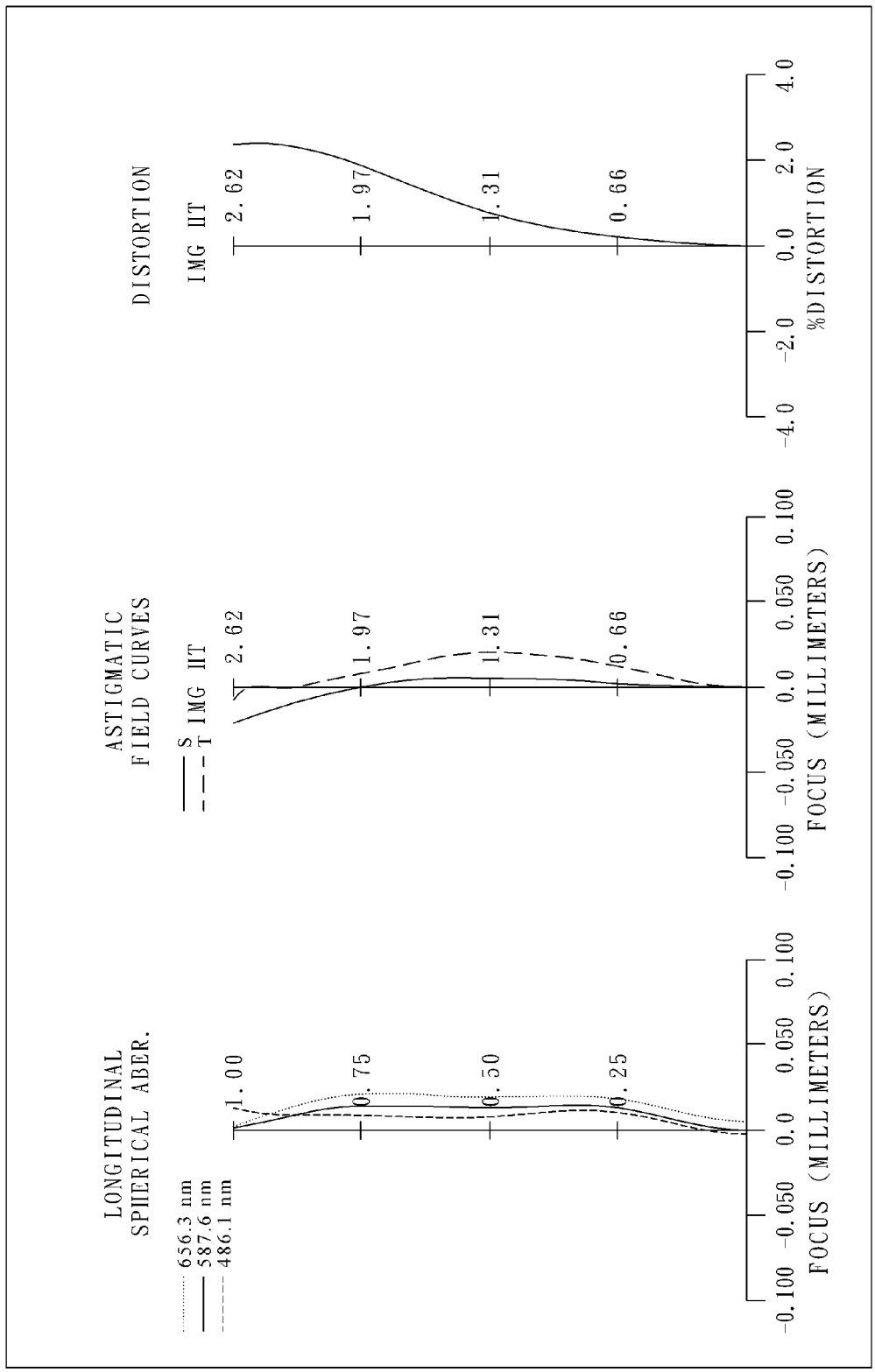
FIG. 5B shows longitudinal spherical aberration curves, astigmatic field curves and a distortion curve of the image capturing apparatus according to the 5th embodiment.

FIG. 5A is a schematic view of an image capturing apparatus according to the 5th embodiment of the present disclosure. FIG. 5B shows, in order from left to right, longitudinal spherical aberration curves, astigmatic field curves and a distortion curve of the image capturing apparatus according to the 5th embodiment.

In FIG. 5A, the image capturing apparatus comprises an imaging lens assembly (not otherwise herein labeled) of the present disclosure and an image sensor 590. The imaging lens assembly comprises, in order from an object side to an image side, a first lens element 510, an aperture stop 500, a second lens element 520, a third lens element 530, a fourth lens element 540, a fifth lens element 550, and a sixth lens element 560, wherein each of the first through sixth lens elements (510-560) is a single and non-cemented lens element.

The first lens element 510 with positive refractive power has an object-side surface 511 being convex in a paraxial region thereof and an image-side surface 512 being concave in a paraxial region thereof, which are both aspheric, and the first lens element 510 is made of plastic.

The second lens element 520 with negative refractive power has an object-side surface 521 being concave in a paraxial region thereof and an image-side surface 522 being concave in a paraxial region thereof, which are both aspheric, and the second lens element 520 is made of plastic. Moreover, the object-side surface 521 or the image-side surface 522 has at least one critical point in an off-axial region.

The third lens element 530 with positive refractive power has an object-side surface 531 being convex in a paraxial region thereof and an image-side surface 532 being concave in a paraxial region thereof, which are both aspheric, and the third lens element 530 is made of plastic.

The fourth lens element 540 with negative refractive power has an object-side surface 541 being concave in a paraxial region thereof and an image-side surface 542 being concave in a paraxial region thereof, which are both aspheric, and the fourth lens element 540 is made of plastic.

The fifth lens element 550 with negative refractive power has an object-side surface 551 being concave in a paraxial region thereof and an image-side surface 552 being concave in a paraxial region thereof, which are both aspheric, and the fifth lens element 550 is made of plastic.

The sixth lens element 560 with positive refractive power has an object-side surface 561 being convex in a paraxial region thereof and an image-side surface 562 being concave in a paraxial region thereof, which are both aspheric, and the sixth lens element 560 is made of plastic. Moreover, the image-side surface 562 has a convex shape in an off-axial region. The object-side surface 561 or the image-side surface 562 has at least one inflection point in an off-axial region.

The imaging lens assembly further comprises a filter 570 located between the sixth lens element 560 and an image surface 580. The filter 570 is made of glass and does not affect the focal length of the imaging lens assembly. The image sensor 590 is disposed on or near the image surface 580 of the imaging lens assembly.

The detailed optical data of the 5th embodiment (as illustrated in FIG. 5A) are shown in TABLE 9, wherein the units of the curvature radius, the thickness and the focal length are expressed in mm, and surfaces #0 to #16 refer to the surfaces in order from the object side to the image side. The aspheric surface data of the 5th embodiment are shown in TABLE 10, wherein k is the conic coefficient in the equation of the aspheric surface profiles, and A4-A16 refer to the 4th to 16th order aspheric coefficients.

TABLE 9

(5th Embodiment)
f = 5.23 mm, Fno = 2.60, HFOV = 26.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.393 | ASP | 0.783 | Plastic | 1.544 | 55.9 | 2.65 |
| 2 | | 35.212 | ASP | 0.049 | | | | |
| 3 | Ape. Stop | Plano | | 0.172 | | | | |
| 4 | Lens 2 | −3.833 | ASP | 0.210 | Plastic | 1.660 | 20.4 | −4.57 |
| 5 | | 14.458 | ASP | 0.082 | | | | |
| 6 | Lens 3 | 3.346 | ASP | 0.250 | Plastic | 1.584 | 28.2 | 303.74 |
| 7 | | 3.316 | ASP | 0.969 | | | | |
| 8 | Lens 4 | −107.709 | ASP | 0.268 | Plastic | 1.639 | 23.3 | −15.82 |
| 9 | | 11.162 | ASP | 0.298 | | | | |
| 10 | Lens 5 | −5.221 | ASP | 0.255 | Plastic | 1.544 | 55.9 | −5.51 |
| 11 | | 7.137 | ASP | 0.050 | | | | |
| 12 | Lens 6 | 4.016 | ASP | 0.618 | Plastic | 1.660 | 20.4 | 8.56 |
| 13 | | 13.049 | ASP | 0.300 | | | | |
| 14 | Filter | Plano | | 0.210 | Glass | 1.517 | 64.2 | — |

TABLE 9-continued (5th Embodiment)
f = 5.23 mm, Fno = 2.60, HFOV = 26.0 deg.

| Surface # | | Curvature Radius | Thickness | Material | Index | Abbe # | Focal Length |
|---|---|---|---|---|---|---|---|
| 15 | | Plano | 0.507 | | | | |
| 16 | Image | Plano | — | | | | |

Note:
Reference wavelength is 587.6 nm.
The effective radius on surface #5 is 0.730 mm.
The effective radius on surface #6 is 0.800 mm.
The effective radius on surface #12 is 1.965 mm.

TABLE 10

Aspheric Coefficients

| Surface # | | | | | | |
|---|---|---|---|---|---|---|
| | 1 | 2 | 4 | 5 | 6 | 7 |
| k = | −5.3086E−01 | −9.0000E+01 | −2.5540E+01 | −4.1532E+01 | −7.8966E+01 | −8.7229E+00 |
| A4 = | 1.9494E−02 | 9.1857E−02 | 4.9084E−01 | 5.1046E−01 | 9.2694E−02 | −1.4530E−01 |
| A6 = | 1.9124E−02 | −1.0094E−01 | −1.1118E+00 | −1.0183E+00 | −5.2109E−01 | 3.2259E−01 |
| A8 = | −1.4705E−02 | 5.3492E−02 | 1.8200E+00 | 1.2812E+00 | 1.0336E+00 | −4.1866E−01 |
| A10 = | 1.3131E−02 | 2.2665E−02 | −1.6416E+00 | 8.3516E−01 | 5.8010E−01 | 8.5080E−01 |
| A12 = | −9.9150E−04 | −2.9512E−02 | 5.6303E−01 | −1.6746E+00 | −1.2598E+00 | −5.7850E−01 |

| Surface # | | | | | | |
|---|---|---|---|---|---|---|
| | 8 | 9 | 10 | 11 | 12 | 13 |
| k = | 9.0000E+01 | −3.7486E+01 | −9.1374E+00 | −7.5500E+01 | −3.4120E+01 | −8.7230E+01 |
| A4 = | −3.0806E−01 | −3.3256E−01 | −1.2676E−01 | −5.5175E−02 | −4.9475E−02 | −7.7527E−02 |
| A6 = | 1.3039E−01 | 2.0325E−01 | −5.1808E−02 | −4.9383E−02 | −3.0151E−03 | 3.2264E−02 |
| A8 = | −1.5145E−01 | −1.5185E−01 | 1.6546E−01 | 6.4845E−02 | 1.1448E−02 | −8.9846E−03 |
| A10 = | −3.6933E−04 | 5.7950E−02 | −1.1539E−01 | −3.3073E−02 | −4.9380E−03 | 6.9144E−04 |
| A12 = | 2.6408E−02 | −4.3153E−03 | 3.2723E−02 | 7.8913E−03 | 1.2190E−03 | 3.8325E−04 |
| A14 = | 1.3808E−02 | 5.0463E−04 | −3.1567E−03 | −7.6418E−04 | −1.8452E−04 | −1.0581E−04 |
| A16 = | | | | | 1.2192E−05 | 7.7559E−06 |

In the 5th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 5th embodiment are as specified below.

| 5th Embodiment | | | |
|---|---|---|---|
| f [mm] | 5.23 | CT5/CT6 | 0.41 |
| Fno | 2.60 | Td/ΣAT | 2.47 |
| HFOV [deg.] | 26.0 | (R3 + R4)/(R3 − R4) | −0.58 |
| V6 | 20.4 | |f1/f2| | 0.58 |
| T23/(CT2 + CT3) | 0.18 | |f5/f6| | 0.64 |
| T34/BL | 0.95 | f/BL | 5.14 |
| ΣAT/T34 | 1.67 | f/f5 | −0.95 |

6th Embodiment

Figure 6A:
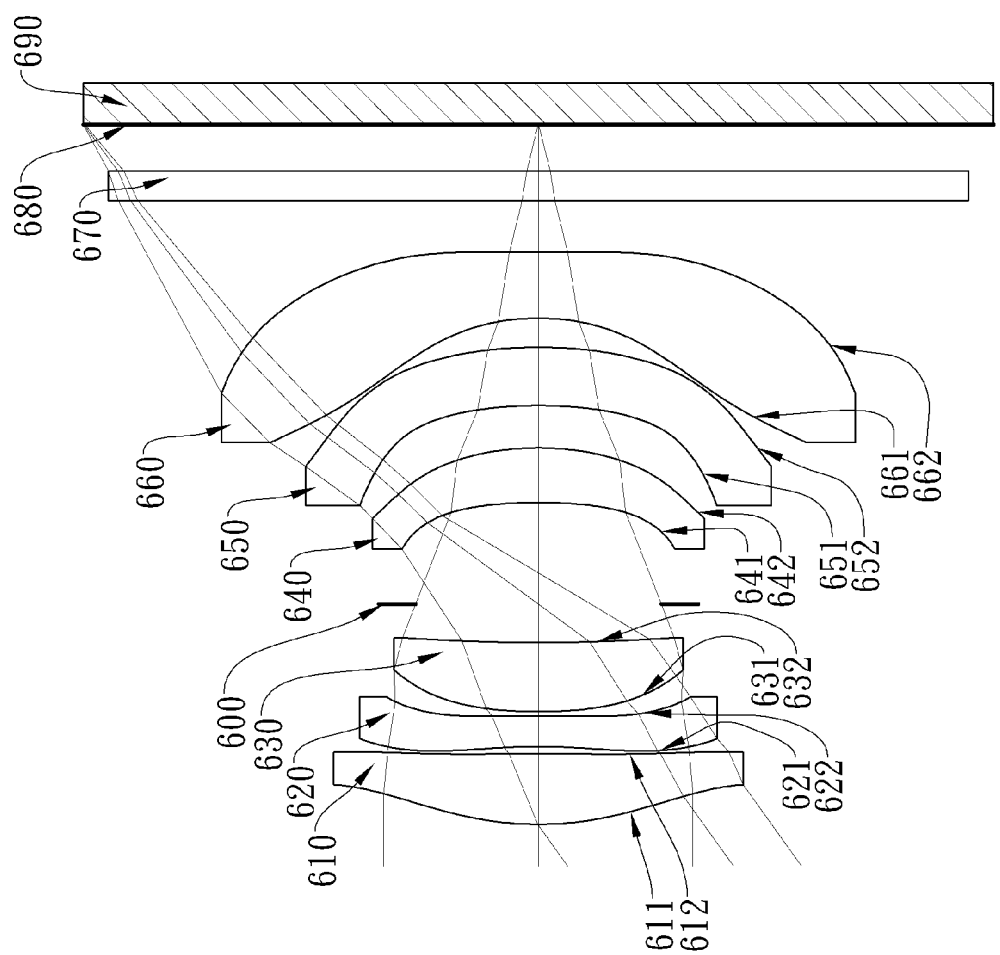
FIG. 6A is a schematic view of an image capturing apparatus according to the 6th embodiment of the present disclosure.
Figure 6B:
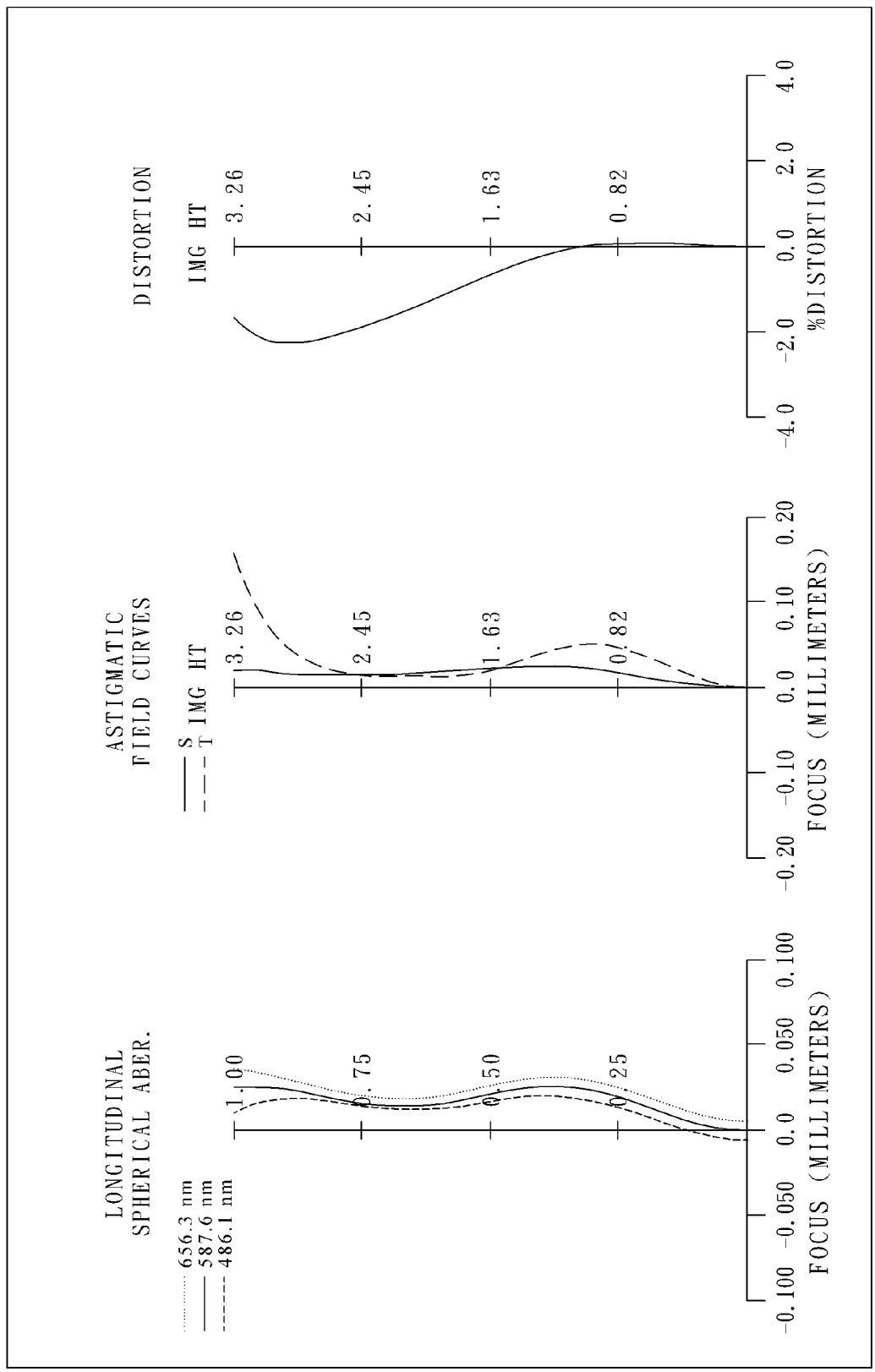
FIG. 6B shows longitudinal spherical aberration curves, astigmatic field curves and a distortion curve of the image capturing apparatus according to the 6th embodiment.

FIG. 6A is a schematic view of an image capturing apparatus according to the 6th embodiment of the present disclosure. FIG. 6B shows, in order from left to right, longitudinal spherical aberration curves, astigmatic field curves and a distortion curve of the image capturing apparatus according to the 6th embodiment.

In FIG. 6A, the image capturing apparatus comprises an imaging lens assembly (not otherwise herein labeled) of the present disclosure and an image sensor 690. The imaging lens assembly comprises, in order from an object side to an image side, a first lens element 610, a second lens element 620, a third lens element 630, an aperture stop 600, a fourth lens element 640, a fifth lens element 650, and a sixth lens element 660, wherein each of the first through sixth lens elements (610-660) is a single and non-cemented lens element.

The first lens element 610 with positive refractive power has an object-side surface 611 being convex in a paraxial region thereof and an image-side surface 612 being convex in a paraxial region thereof, which are both aspheric, and the first lens element 610 is made of plastic.

The second lens element 620 with negative refractive power has an object-side surface 621 being concave in a paraxial region thereof and an image-side surface 622 being convex in a paraxial region thereof, which are both aspheric, and the second lens element 620 is made of plastic. Moreover, the object-side surface 621 or the image-side surface 622 has at least one critical point in an off-axial region.

The third lens element 630 with positive refractive power has an object-side surface 631 being convex in a paraxial region thereof and an image-side surface 632 being concave in a paraxial region thereof, which are both aspheric, and the third lens element 630 is made of plastic.

The fourth lens element 640 with positive refractive power has an object-side surface 641 being concave in a paraxial region thereof and an image-side surface 642 being convex in a paraxial region thereof, which are both aspheric, and the fourth lens element 640 is made of plastic.

The fifth lens element 650 with positive refractive power has an object-side surface 651 being concave in a paraxial region thereof and an image-side surface 652 being convex in a paraxial region thereof, which are both aspheric, and the fifth lens element 650 is made of plastic.

The sixth lens element 660 with positive refractive power has an object-side surface 661 being concave in a paraxial region thereof and an image-side surface 662 being concave in a paraxial region thereof, which are both aspheric, and the sixth lens element 660 is made of plastic. Moreover, the image-side surface 662 has a convex shape in an off-axial region; the object-side surface 661 or the image-side surface 662 has at least one inflection point in an off-axial region.

The imaging lens assembly further comprises a filter 670 located between the sixth lens element 660 and an image surface 680. The filter 670 is made of glass and does not affect the focal length of the imaging lens assembly. The image sensor 690 is disposed on or near the image surface 680 of the imaging lens assembly.

The image capturing apparatus may comprise a shutter device or aperture adjusting device S, as shown in FIG. 9, located between the third lens element 630 and the fourth lens element 640. When the shutter device or aperture adjusting device S is configured to provide a large aperture, it can facilitate sufficient light entry and increase image brightness. Alternatively, when the shutter device or aperture adjusting device S is configured to provide a small aperture, a telephoto mode and a larger depth of field will become available. As such, by optionally equipping the imaging lens assembly with a shutter device or aperture adjusting device S, the imaging lens assembly of the present disclosure can be installed in a wide variety of smart devices and meet diverse market demands.

The detailed optical data of the 6th embodiment (as illustrated in FIG. 6A) are shown in TABLE 11, wherein the units of the curvature radius, the thickness and the focal length are expressed in mm, and surfaces #0 to #16 refer to the surfaces in order from the object side to the image side. The aspheric surface data of the 6th embodiment are shown in TABLE 12, wherein k is the conic coefficient in the equation of the aspheric surface profiles, and A4-A16 refer to the 4th to 16th order aspheric coefficients.

TABLE 11

(6th Embodiment)
f = 4.61 mm, Fno = 2.08, HFOV = 35.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.285 | ASP | 0.506 | | 1.545 | 56.0 | 3.94 |
| 2 | | −31.909 | ASP | 0.052 | Plastic | | | |
| 3 | Lens 2 | −4.152 | ASP | 0.220 | | 1.660 | 20.4 | −8.88 |
| 4 | | −14.528 | ASP | 0.030 | Plastic | | | |
| 5 | Lens 3 | 3.059 | ASP | 0.496 | | 1.544 | 55.9 | 7.52 |
| 6 | | 11.462 | ASP | 0.276 | Plastic | | | |
| 7 | Ape. Stop | Plano | | 0.730 | | | | |
| 8 | Lens 4 | −3.748 | ASP | 0.392 | Plastic | 1.544 | 55.9 | 8.14 |
| 9 | | −2.105 | ASP | 0.304 | | | | |
| 10 | Lens 5 | −3.306 | ASP | 0.418 | Plastic | 1.660 | 20.4 | 263.05 |
| 11 | | −3.407 | ASP | 0.209 | | | | |
| 12 | Lens 6 | −1.722 | ASP | 0.471 | Plastic | 1.544 | 55.9 | −2.75 |
| 13 | | 12.552 | ASP | 0.373 | | | | |
| 14 | Filter | Plano | | 0.210 | Glass | 1.517 | 64.2 | — |
| 15 | | Plano | | 0.336 | | | | |
| 16 | Image | Plano | | — | | | | |

Note:
Reference wavelength is 587.6 nm.
The effective radius on surface #4 is 1.090 mm.
The effective radius on surface #10 is 1.280 mm.

TABLE 12

Aspheric Coefficients

| Surface # | | | | | |
|---|---|---|---|---|---|
| 1 | 2 | 3 | 4 | 5 | 6 |
| k = −5.2180E+00 | −9.0000E+01 | −2.9459E+01 | 6.3493E+01 | 3.2740E+00 | 8.2506E+01 |
| A4 = 2.4076E−02 | 2.4850E−02 | 7.4543E−02 | 1.0060E−01 | 6.1156E−03 | −2.4858E−02 |
| A6 = −1.5399E−02 | 2.0322E−02 | 2.1409E−02 | 9.8730E−02 | 2.0961E−01 | 2.1511E−02 |
| A8 = −1.2409E−02 | −3.4742E−02 | −2.6545E−02 | −1.1530E−01 | −2.4089E−01 | −2.0973E−02 |
| A10 = 7.8124E−03 | 1.4619E−02 | 8.5262E−03 | 5.0716E−02 | 1.4094E−01 | 1.3501E−02 |
| A12 = −1.2255E−03 | −2.1076E−03 | −6.0420E−04 | −5.7823E−03 | −3.3311E−02 | −7.2255E−03 |

TABLE 12-continued

Aspheric Coefficients

| Surface # | | | | | |
|---|---|---|---|---|---|
| 8 | 9 | 10 | 11 | 12 | 13 |
| k = 1.2939E+01 | −5.5929E+00 | 3.9602E+00 | −1.7467E−02 | −3.0508E+00 | −4.2505E−02 |
| A4 = −7.2727E−02 | −1.1794E−01 | −6.0801E−02 | −4.9286E−02 | −1.7780E−01 | −1.2565E−01 |
| A6 = −3.6016E−03 | −1.2200E−02 | 6.5332E−02 | 4.7190E−02 | 7.3597E−02 | 6.4571E−02 |
| A8 = 3.5065E−02 | 1.1760E−01 | −9.5047E−02 | −4.8087E−02 | 1.9986E−02 | −3.0434E−02 |
| A10 = −4.0764E−01 | −3.2232E−01 | −2.2629E−03 | 1.2450E−02 | −2.0304E−02 | 1.0905E−02 |
| A12 = 5.3753E−01 | 2.7543E−01 | 1.4124E−02 | −1.3432E−05 | 5.4648E−03 | −2.5425E−03 |
| A14 = −2.3233E−01 | −7.2952E−02 | −2.3147E−03 | −1.8602E−04 | −6.4691E−04 | 3.2777E−04 |
| A16 = | | | | 2.8798E−05 | −1.7889E−05 |

In the 6th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 6th embodiment are as specified below.

| 6th Embodiment | | | |
|---|---|---|---|
| f [mm] | 4.61 | CT5/CT6 | 0.89 |
| Fno | 2.08 | Td/ΣAT | 2.56 |
| HFOV [deg.] | 35.6 | (R3 + R4)/(R3 − R4) | −1.80 |
| V6 | 55.9 | |f1/f2| | 0.44 |
| T23/(CT2 + CT3) | 0.04 | |f5/f6| | 95.65 |
| T34/BL | 1.09 | f/BL | 5.02 |
| ΣAT/T34 | 1.59 | f/f5 | 0.02 |

7th Embodiment

Figure 7A:
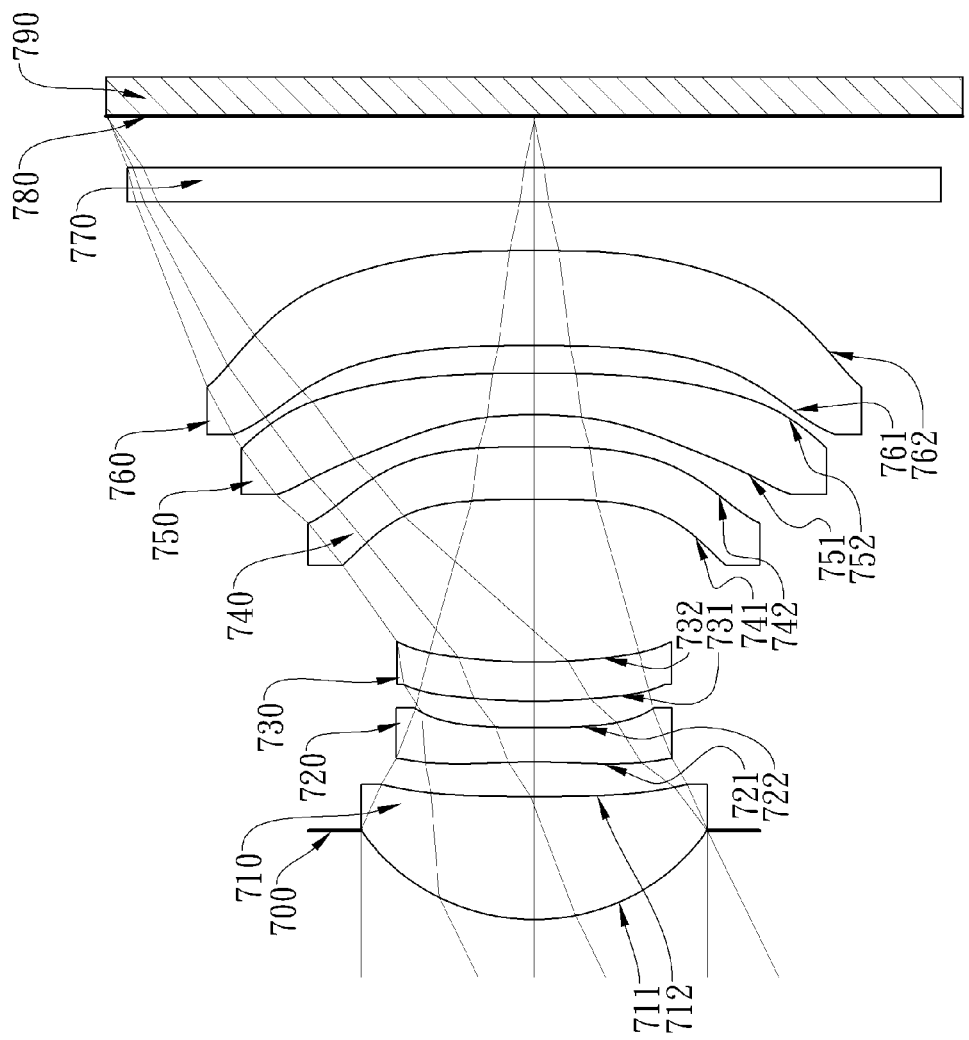
FIG. 7A is a schematic view of an image capturing apparatus according to the 7th embodiment of the present disclosure.
Figure 7B:
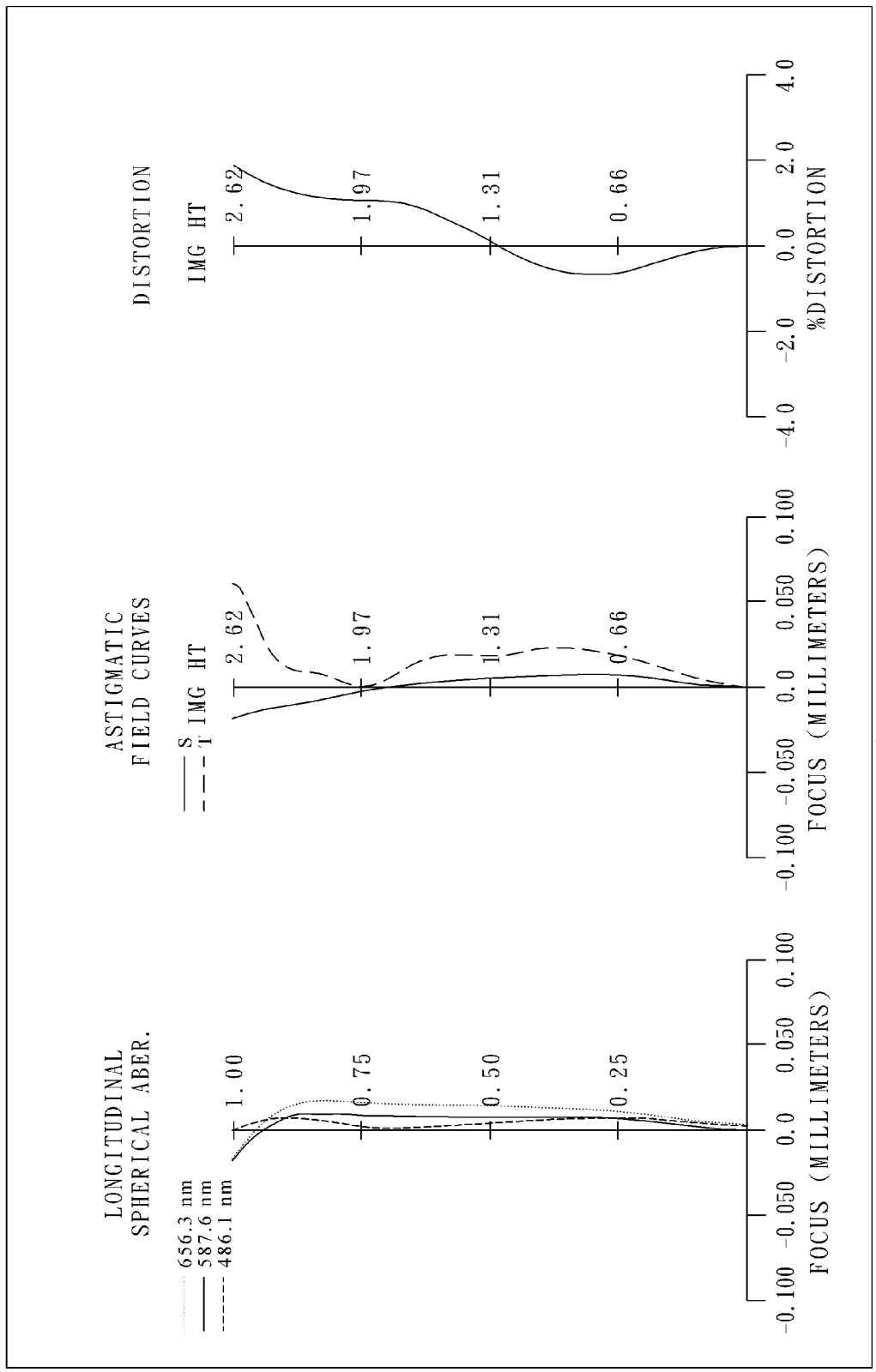
FIG. 7B shows longitudinal spherical aberration curves, astigmatic field curves and a distortion curve of the image capturing apparatus according to the 7th embodiment.

FIG. 7A is a schematic view of an image capturing apparatus according to the 7th embodiment of the present disclosure. FIG. 7B shows, in order from left to right, longitudinal spherical aberration curves, astigmatic field curves and a distortion curve of the image capturing apparatus according to the 7th embodiment.

In FIG. 7A, the image capturing apparatus comprises an imaging lens assembly (not otherwise herein labeled) of the present disclosure and an image sensor 790. The imaging lens assembly comprises, in order from an object side to an image side, an aperture stop 700, a first lens element 710, a second lens element 720, a third lens element 730, a fourth lens element 740, a fifth lens element 750, and a sixth lens element 760, wherein each of the first through sixth lens elements (710-760) is a single and non-cemented lens element.

The first lens element 710 with positive refractive power has an object-side surface 711 being convex in a paraxial region thereof and an image-side surface 712 being concave in a paraxial region thereof, which are both aspheric, and the first lens element 710 is made of plastic.

The second lens element 720 with negative refractive power has an object-side surface 721 being concave in a paraxial region thereof and an image-side surface 722 being concave in a paraxial region thereof, which are both aspheric, and the second lens element 720 is made of plastic. Moreover, the object-side surface 721 or the image-side surface 722 has at least one critical point in an off-axial region.

The third lens element 730 with positive refractive power has an object-side surface 731 being convex in a paraxial region thereof and an image-side surface 732 being concave in a paraxial region thereof, which are both aspheric, and the third lens element 730 is made of plastic.

The fourth lens element 740 with negative refractive power has an object-side surface 741 being concave in a paraxial region thereof and an image-side surface 742 being convex in a paraxial region thereof, which are both aspheric, and the fourth lens element 740 is made of plastic.

The fifth lens element 750 with negative refractive power has an object-side surface 751 being concave in a paraxial region thereof and an image-side surface 752 being convex in a paraxial region thereof, which are both aspheric, and the fifth lens element 750 is made of plastic.

The sixth lens element 760 with negative refractive power has an object-side surface 761 being concave in a paraxial region thereof and an image-side surface 762 being convex in a paraxial region thereof, which are both aspheric, and the sixth lens element 760 is made of plastic. Moreover, the object-side surface 761 or the image-side surface 762 has at least one inflection point in an off-axial region.

The imaging lens assembly further comprises a filter 770 located between the sixth lens element 760 and an image surface 780. The filter 770 is made of glass and does not affect the focal length of the imaging lens assembly. The image sensor 790 is disposed on or near the image surface 780 of the imaging lens assembly.

The detailed optical data of the 7th embodiment (as illustrated in FIG. 7A) are shown in TABLE 13, wherein the units of the curvature radius, the thickness and the focal length are expressed in mm, and surfaces #0 to #16 refer to the surfaces in order from the object side to the image side. The aspheric surface data of the 7th embodiment are shown in TABLE 14, wherein k is the conic coefficient in the equation of the aspheric surface profiles, and A4-A16 refer to the 4th to 16th order aspheric coefficients.

TABLE 13

(7th Embodiment)
f = 5.26 mm, Fno = 2.48, HFOV = 26.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.544 | | | | |
| 2 | Lens 1 | 1.317 | ASP | 0.753 | Plastic | 1.544 | 55.9 | 2.58 |
| 3 | | 17.779 | ASP | 0.213 | | | | |
| 4 | Lens 2 | −3.865 | ASP | 0.210 | Plastic | 1.660 | 20.4 | −4.34 |
| 5 | | 11.292 | ASP | 0.162 | | | | |
| 6 | Lens 3 | 3.162 | ASP | 0.240 | Plastic | 1.544 | 55.9 | 196.21 |
| 7 | | 3.172 | ASP | 0.998 | | | | |
| 8 | Lens 4 | −17.566 | ASP | 0.322 | Plastic | 1.660 | 20.4 | −348.86 |
| 9 | | −19.156 | ASP | 0.197 | | | | |
| 10 | Lens 5 | −2.887 | ASP | 0.255 | Plastic | 1.544 | 55.9 | −6.94 |
| 11 | | −12.656 | ASP | 0.169 | | | | |
| 12 | Lens 6 | −21.970 | ASP | 0.582 | Plastic | 1.660 | 20.4 | −530.02 |
| 13 | | −23.689 | ASP | 0.300 | | | | |
| 14 | Filter | Plano | | 0.210 | Glass | 1.517 | 64.2 | — |
| 15 | | Plano | | 0.316 | | | | |
| 16 | Image | Plano | | — | | | | |

Note:
Reference wavelength is 587.6 nm.
The effective radius on surface #6 is 0.800 mm.

TABLE 14

Aspheric Coefficients

| Surface # | 2 | 3 | 4 | 5 | 6 | 7 |
|---|---|---|---|---|---|---|
| k = | −3.5754E−01 | 8.9342E+01 | −3.9776E+01 | 3.4725E+01 | −8.5339E+01 | 1.0530E+00 |
| A4 = | 1.7909E−02 | 8.1096E−02 | 3.6733E−01 | 3.6829E−01 | 8.6368E−02 | −1.6038E−01 |
| A6 = | 1.1305E−02 | 2.4251E−03 | −5.9482E−01 | −3.6692E−01 | −4.9638E−01 | 3.2278E−01 |
| A8 = | 1.8989E−02 | −1.4362E−01 | 8.4888E−01 | 2.7526E−01 | 1.2870E+00 | −4.2090E−01 |
| A10 = | −2.7339E−02 | 2.6457E−01 | −5.4981E−01 | 1.3393E+00 | −4.5984E−01 | 9.3938E−01 |
| A12 = | 2.2489E−02 | −1.4769E−01 | 1.7131E−02 | −1.5177E+00 | −3.7319E−01 | −6.7259E−01 |

| Surface # | 8 | 9 | 10 | 11 | 12 | 13 |
|---|---|---|---|---|---|---|
| k = | −7.7390E+01 | −8.4715E+01 | −1.1024E+01 | −3.5923E+01 | 6.5069E+01 | −8.9463E+01 |
| A4 = | −2.6131E−01 | −3.5680E−01 | −2.5814E−01 | −3.4436E−02 | −1.5151E−01 | −1.8318E−01 |
| A6 = | 2.6717E−01 | 4.6818E−01 | 2.3451E−01 | −3.6711E−02 | 1.6326E−01 | 1.6295E−01 |
| A8 = | −4.1388E−01 | −5.0231E−01 | −4.1439E−02 | 5.7025E−02 | −1.0905E−01 | −8.8687E−02 |
| A10 = | 1.5677E−01 | 2.7115E−01 | −4.4305E−02 | −3.0305E−02 | 3.3707E−02 | 2.8620E−02 |
| A12 = | 8.1784E−02 | −6.0668E−02 | 2.2604E−02 | 6.7709E−03 | −4.4464E−03 | −6.2101E−03 |
| A14 = | −4.4393E−02 | 3.8197E−03 | −2.9916E−03 | −5.4507E−04 | 2.1346E−04 | 8.4978E−04 |
| A16 = | | | | | −6.5025E−06 | −5.1037E−05 |

In the 7th embodiment, the equation of the aspheric surface profiles of the aforementioned lens elements is the same as the equation from the 1st embodiment. Also, the definitions of the parameters shown in the table below are the same as those stated in the 1st embodiment, but the values for the conditions in the 7th embodiment are as specified below.

| 7th Embodiment | | | |
|---|---|---|---|
| f [mm] | 5.26 | CT5/CT6 | 0.44 |
| Fno | 2.48 | Td/ΣAT | 2.36 |
| HFOV [deg.] | 26.0 | (R3 + R4)/(R3 − R4) | −0.49 |
| V6 | 20.4 | |f1/f2| | 0.59 |
| T23/(CT2 + CT3) | 0.36 | |f5/f6| | 0.01 |

-continued

| 7th Embodiment | | | |
|---|---|---|---|
| T34/BL | 1.21 | f/BL | 6.37 |
| ΣAT/T34 | 1.74 | f/f5 | −0.76 |

The foregoing description, for purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, and thereby to enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising, in order from an object side to an image side:
    a first lens element with positive refractive power having an object-side surface being convex in a paraxial region thereof;
    a second lens element with negative refractive power having an object-side surface being concave in a paraxial region thereof;
    a third lens element;
    a fourth lens element;
    a fifth lens element having an object-side surface being concave in a paraxial region thereof, both of the object-side surface and an image-side surface thereof being aspheric; and
    a sixth lens element having both of an object-side surface and an image-side surface thereof being aspheric;
    wherein the imaging lens assembly has a total of six lens elements; each of the first through sixth lens elements is a single and non-cemented lens element; a sum of axial distances between every two adjacent lens elements of the imaging lens assembly is $\Sigma AT$, an axial distance between the third lens element and the fourth lens element is T34, a focal length of the first lens element is f1, a focal length of the second lens element is f2, a focal length of the imaging lens assembly is f, an axial distance between the image-side surface of the sixth lens element and an image surface is BL, and the following conditions are satisfied:

$1.2 < \Sigma AT/T34 < 2.0$;

$|f1/f2| < 0.90$;

and $4.0 < f/BL$.

2. The imaging lens assembly of claim 1, wherein a curvature radius of the object-side surface of the second lens element is R3, a curvature radius of an image-side surface of the second lens element is R4, and the following condition is satisfied:

$-3.0 < (R3+R4)/(R3-R4) < 0$.

3. The imaging lens assembly of claim 1, wherein the axial distance between the third lens element and the fourth lens element is T34, the axial distance between the image-side surface of the sixth lens element and the image surface is BL, and the following condition is satisfied:

$0.80 < T34/BL < 2.50$.

4. The imaging lens assembly of claim 1, wherein the second lens element has at least one critical point in an off-axial region thereof.

5. The imaging lens assembly of claim 1, wherein the focal length of the imaging lens assembly is f, a focal length of the fifth lens element is f5, and the following condition is satisfied:

$-1.50 < f/f5 < -0.40$.

6. The imaging lens assembly of claim 1, wherein an axial distance between the object-side surface of the first lens element and the image-side surface of the sixth lens element is Td, the sum of axial distances between every two adjacent lens elements of the imaging lens assembly is $\Sigma AT$, and the following condition is satisfied:

$1.50 < Td/\Sigma AT < 3.50$.

7. The imaging lens assembly of claim 1, wherein the focal length of the second lens element is f2, a focal length of the y-th lens element is fy, and the following condition is satisfied:

$|f2| < |fy|$, wherein $y=3\sim 6$.

8. The imaging lens assembly of claim 1, wherein the sixth lens element has positive refractive power.

9. The imaging lens assembly of claim 1, wherein an Abbe number of the sixth lens element is V6, and the following condition is satisfied:

$5 < V6 < 32$.

10. The imaging lens assembly of claim 1, wherein the sixth lens element has at least one inflection point in an off-axial region thereof.

11. The imaging lens assembly of claim 1, wherein a shutter device or aperture adjusting device is provided between the third lens element and the fourth lens element.

12. The imaging lens assembly of claim 1, wherein an axial distance between the second lens element and the third lens element is T23, a central thickness of the second lens element is CT2, a central thickness of the third lens element is CT3, and the following condition is satisfied:

$0 < T23/(CT2+CT3) < 0.80$.

13. The imaging lens assembly of claim 1, wherein a focal length of the fifth lens element is f5, a focal length of the sixth lens element is f6, and the following condition is satisfied:

$|f5/f6| < 1.0$.

14. The imaging lens assembly of claim 1, wherein a central thickness of the fifth lens element is CT5, a central thickness of the sixth lens element is CT6, and the following condition is satisfied:

$0.10 < CT5/CT6 < 1.0$.

15. The imaging lens assembly of claim 1, wherein the focal length of the imaging lens assembly is f, the axial distance between the image-side surface of the sixth lens element and the image surface is BL, and the following condition is satisfied:

$4.0 < f/BL < 10.0$.

16. An image capturing apparatus comprising the imaging lens assembly of claim 1 and an image sensor.

17. An electronic device comprising the image capturing apparatus of claim 16.

18. An imaging lens assembly comprising, in order from an object side to an image side:
    a first lens element with positive refractive power having an object-side surface being convex in a paraxial region thereof;
    a second lens element with negative refractive power having an object-side surface being concave in a paraxial region thereof;
    a third lens element;
    a fourth lens element;

a fifth lens element having an object-side surface being concave in a paraxial region thereof, both of the object-side surface and an image-side surface thereof being aspheric; and a sixth lens element having both of an object-side surface and an image-side surface thereof being aspheric;

wherein the imaging lens assembly has a total of six lens elements; each of the first through sixth lens elements is a single and non-cemented lens element; a sum of axial distances between every two adjacent lens elements of the imaging lens assembly is $\Sigma AT$, an axial distance between the third lens element and the fourth lens element is T34, a focal length of the first lens element is f1, a focal length of the x-th element is fx, a focal length of the imaging lens assembly is f, an axial distance between the image-side surface of the sixth lens element and an image surface is BL, and the following conditions are satisfied:

$1.2 < \Sigma AT/T34 < 2.5$;

$|f1| > |fx|$, wherein x=2~6; and $4.0 < f/BL$.

19. The imaging lens assembly of claim 18, wherein the sixth lens element has positive refractive power, an Abbe number of the sixth lens element is V6, and the following condition is satisfied:

$5 < V6 < 32$.

20. The imaging lens assembly of claim 18, wherein a curvature radius of the object-side surface of the second lens element is R3, a curvature radius of an image-side surface of the second lens element is R4, and the following condition is satisfied:

$-3.0 < (R3+R4)/(R3-R4) < 0$.

21. The imaging lens assembly of claim 18, wherein the focal length of the imaging lens assembly is f, a focal length of the fifth lens element is f5, and the following condition is satisfied:

$-1.50 < f/f5 < -0.40$.

22. The imaging lens assembly of claim 18, wherein a central thickness of the fifth lens element is CT5, a central thickness of the sixth lens element is CT6, and the following condition is satisfied:

$0.10 < CT5/CT6 < 1.0$.

23. The imaging lens assembly of claim 18, wherein an axial distance between the second lens element and the third lens element is T23, a central thickness of the second lens element is CT2, a central thickness of the third lens element is CT3, and the following condition is satisfied:

$0 < T23/(CT2+CT3) < 0.80$.

24. An electronic device comprising the imaging lens assembly of claim 18 and an image sensor.

25. An imaging lens assembly comprising, in order from an object side to an image side:

a first lens element with positive refractive power having an object-side surface being convex in a paraxial region thereof;

a second lens element having negative refractive power;

a third lens element;

a fourth lens element;

a fifth lens element; and a sixth lens element having both of an object-side surface and an image-side surface thereof being aspheric, and at least one inflection point in an off-axial region thereof;

wherein the imaging lens assembly has a total of six lens elements; each of the first through sixth lens elements is a single and non-cemented lens element; a sum of axial distances between every two adjacent lens elements of the imaging lens assembly is $\Sigma AT$, an axial distance between the third lens element and the fourth lens element is T34, a focal length of the first lens element is f1, a focal length of the x-th element is fx, a focal length of the imaging lens assembly is f, an axial distance between the image-side surface of the sixth lens element and an image surface is BL, an axial distance between the second lens element and the third lens element is T23, a central thickness of the second lens element is CT2, a central thickness of the third lens element is CT3, and the following conditions are satisfied:

$1.2 < \Sigma AT/T34 < 2.0$;

$|f1| > |fx|$, wherein x=2~6;

$4.0 < f/BL$;

and $0 < T23/(CT2+CT3) < 0.80$.

26. The imaging lens assembly of claim 25, wherein a focal length of the second lens element is f2, a focal length of the y-th lens element is fy, and the following condition is satisfied:

$|f2| < |fy|$, wherein y=3~6.

27. The imaging lens assembly of claim 25, wherein the image-side surface of the sixth lens element is concave in a paraxial region thereof and has at least one convex shape in an off-axial region thereof.

28. The imaging lens assembly of claim 25, wherein the sixth lens element has positive refractive power, an Abbe number of the sixth lens element is V6, and the following condition is satisfied:

$5 < V6 < 32$.

29. The imaging lens assembly of claim 25, wherein an axial distance between the object-side surface of the first lens element and the image-side surface of the sixth lens element is Td, the sum of axial distances between every two adjacent lens elements of the imaging lens assembly is $\Sigma AT$, and the following condition is satisfied:

$1.5 < Td/\Sigma AT < 3.5$.

30. The imaging lens assembly of claim 25, wherein the axial distance between the third lens element and the fourth lens element is T34, the axial distance between the image-side surface of the sixth lens element and the image surface is BL, and the following condition is satisfied:

$0.80 < T34/BL < 2.50$.

31. The imaging lens assembly of claim 25, wherein a focal length of the fifth lens element is f5, a focal length of the sixth lens element is f6, and the following condition is satisfied:

$$|f5/f6|<1.0.$$

32. An electronic device comprising the imaging lens assembly of claim 25 and an image sensor.

* * * * *